(12) United States Patent
Grey et al.

(10) Patent No.: US 6,754,850 B2
(45) Date of Patent: Jun. 22, 2004

(54) SYSTEM AND METHOD FOR PERFORMING BATCH SYNCHRONIZATION FOR A TEST SEQUENCE

(75) Inventors: James Grey, Cedar Park, TX (US); Douglas Melamed, Pflugerville, TX (US); Jon Bellin, Austin, TX (US)

(73) Assignee: National Instruments Corporation, Austin, TX (US)

(*) Notice: Subject to any disclaimer, the term of this patent is extended or adjusted under 35 U.S.C. 154(b) by 561 days.

(21) Appl. No.: 09/798,363

(22) Filed: Mar. 2, 2001

(65) Prior Publication Data

US 2002/0124205 A1 Sep. 5, 2002

(51) Int. Cl.[7] .............................................. G06F 11/00
(52) U.S. Cl. ........................ 714/33; 714/25; 714/32; 714/36; 714/38; 714/47
(58) Field of Search ...................... 714/33, 25, 32, 714/36, 38, 47

(56) References Cited

U.S. PATENT DOCUMENTS

| | | | |
|---|---|---|---|
| 5,261,097 A | | 11/1993 | Saxon |
| 5,504,881 A | * | 4/1996 | Sirurget ........................ 714/38 |
| 5,953,530 A | * | 9/1999 | Rishi et al. .................. 717/127 |
| 6,002,868 A | | 12/1999 | Jenkins et al. |
| 6,023,773 A | | 2/2000 | O'Donnell et al. |
| 6,336,088 B1 | | 1/2002 | Bauman et al. |
| 6,397,378 B1 | | 5/2002 | Grey et al. |

OTHER PUBLICATIONS

Johnson, Laura, "Test and Measurement—Understanding Test Executives," Webpage www.testandmeasurement.com. content/news/ , Oct. 16, 2000, pp. 1–9.

National Instruments Corporation, LabVIEW, "Test Executive Reference Manual," Aug. 1997.

* cited by examiner

Primary Examiner—Nadeem Iqbal
Assistant Examiner—Christopher M Euripidou
(74) Attorney, Agent, or Firm—Meyertons Hood Kivlin Kowert & Goetzel, P.C.; Jeffrey C. Hood; Jason L. Burgess

(57) ABSTRACT

A method for creating a computer program to be executed by a plurality of threads, in which the method utilizes a technique for execution synchronization referred to herein as a batch synchronization section. According to this technique, a plurality of threads may be associated with one another as a "batch" of threads. Each thread in the plurality (batch) of threads may execute the computer program simultaneously. The batch synchronization section may specify a portion of the computer program for which the execution of the portion by the plurality of threads is to be synchronized. In one embodiment different types of batch synchronization sections may be specified, wherein each type of batch synchronization section performs a different type of execution synchronization. In one embodiment the method may enable execution synchronization behavior for multiple concurrent executions of a test executive test sequence to be specified. The test sequence may include one or more batch synchronization sections. Multiple threads may each execute an instance of the test sequence to concurrently to test a group of units under test, and the batch synchronization sections may coordinate the execution of the multiple threads where necessary.

35 Claims, 26 Drawing Sheets

SYSTEM AND METHOD FOR PERFORMING BATCH SYNCHRONIZATION FOR A TEST SEQUENCE

FIELD OF THE INVENTION

The present invention relates to the field of synchronizing software execution, e.g., synchronizing multi-threaded execution of a program. One embodiment of the invention also relates to the field of computer-based testing of products or devices.

DESCRIPTION OF THE RELATED ART

In the software arts, when working with multiple threads or processes, the problem of execution synchronization often arises. As used herein, execution synchronization may refer to any of various techniques enabling multiple threads or processes to execute together effectively. For example, one aspect of execution synchronization pertains to coordinating multiple threads or processes to share data or resources. For example, when one thread is writing to a file, other threads may need to be prevented from doing so at the same time in order to prevent data errors in the file. Also, threads may need to be prevented from reading from the file while it is being written to, in order to ensure that partial or incorrect data is not read.

Another aspect of execution synchronization pertains to defining and enforcing a series of operations that must be performed atomically. For example, consider a program where one thread updates a static data structure containing X and Y coordinates for items to be displayed by another thread. If the update thread alters the X coordinate for an item and is preempted before it can change the Y coordinate, the display thread may be scheduled before the Y coordinate is updated, resulting in the item being displayed at the wrong location.

Other aspects of execution synchronization include: forcing a group of threads to wait for each other until proceeding past a specified location; enabling threads to pass data to each other, e.g., so that a consumer thread can use data produced by a producer thread; notifying one or more threads when a particular event or condition occurs; etc.

In the prior art, various types of "synchronization objects" have been used in synchronizing execution among multiple threads and processes. For example, one type of synchronization object is a mutex. A mutex (short for mutual exclusion) may be used to guarantee exclusive access to a shared resource, typically by controlling access to the resource through "lock" and "unlock" operations. For example, referring to the above example of the update and display threads, to solve this X,Y coordinate update problem, the update thread may lock (acquire) a mutex indicating that the coordinate data structure is in use before performing the update. The update thread may then unlock (release) the mutex after both coordinates have been processed. The display thread must wait for the mutex to be unlocked before updating the display. This technique of waiting for a mutex is often called "blocking" on a mutex because the thread or process is blocked and cannot continue until the mutex is released. Other types of synchronization objects known in the prior art include semaphores and queues.

Programmers often find it difficult to properly implement execution synchronization using synchronization objects such as a rendezvous, mutex, or semaphore. For example, in the prior art, the programmer is typically responsible for coding and managing execution synchronization, including properly acquiring and releasing synchronization objects; defining and implementing timeout behavior when waiting to acquire a synchronization object; etc. In a complex application, this can require a significant amount of detailed work on the part of the programmer and can be difficult to accomplish.

Therefore, an improved system and method for synchronizing execution of software activities (i.e., processes or threads) is desired. It would be desirable for the improved system and method to simplify the task of implementing execution synchronization for an application. In particular, it would be desirable to abstract this task above the code-level, so that the programmer can work at a more intuitive level, e.g., using a graphical user interface (GUI). It would also be desirable to provide a method to work with a group or batch of threads at a higher level by defining "batch synchronization sections" operable to synchronize the execution of the batch of threads in various ways.

Execution synchronization is a common problem in many types of systems and software environments. One class of systems which has heretofore suffered from a lack of ability to manage execution synchronization is the class of computer-based "test executive" systems. In modern testing environments, software referred to as test executive software may be used to control or perform tests. The test executive typically allows the user to organize and execute a sequence of test modules, e.g., via a graphical user interface. For example, a test sequence may comprise a series of steps, wherein each step references a test module, and wherein each test module is executable to perform and/or control a test of one or more units under test (UUTs). Each step may have a parameter or property configuration that affects execution of the step. Test step parameters or properties may affect or control a wide variety of test aspects, such as whether data-logging is enabled for the test step, whether the step is executed in a loop, etc., as well as product-specific test aspects.

Thus, when executed, test modules corresponding to the steps in the test sequence may be operable to perform a desired sequence of tests on the unit under test. For example, various test modules may interact with instruments that measure and/or control the unit under test. For example, in a manufacturing environment, test executive software may be used to test manufactured products or devices, e.g., by executing various test modules that interact with instruments that measure and/or control the products.

Thus, test executive software operates as the control center for an automated test system. More specifically, the test executive allows the user to create, configure, and/or control test sequence execution for various test applications, such as production and manufacturing test applications. Test executive software typically includes various features, such as test sequencing based on pass/fail results, logging of test results, and report generation, among others.

The following comprises a glossary of test executive nomenclature used herein:
  Code Module—A program module, such as a Windows Dynamic Link Library (.dll), Java class file, LabVIEW VI (.vi), etc., or other software object or component that includes one or more functions or procedures that perform a specific test or other action.
  Test Module—A code module that performs a test.
  Step—Any action, such as calling a test module or step module to perform a specific test, that the user can include within a sequence of other actions.

Step Module—The code module that a step calls.

Sequence—A series of steps that the user specifies for execution in a particular order. Whether and when a step is executed can depend on the results of previous steps.

Subsequence—A sequence that another sequence calls. The user specifies a subsequence call as a step in the calling sequence.

Sequence File—A file that contains the definition of one or more sequences.

Sequence Editor—A program that provides a graphical user interface for creating, editing, and debugging sequences.

Run-time Operator Interface—A program that provides a graphical user interface for executing sequences on a production station. A sequence editor and run-time operator interface can be separate application programs or different aspects of the same program.

Test Executive Engine—A module or set of modules that provide an API for creating, editing, executing, and debugging sequences. A sequence editor or run-time execution operator interface uses the services of a test executive engine.

Application Development Environment (ADE)—A programming environment such as LabVIEW, LabWindows/CVI, Microsoft Visual C++, Microsoft Visual Basic, Delphi, etc., in which the user can create test modules and run-time operator interfaces.

Unit Under Test (UUT)—A device or component that is being tested; may include software and/or hardware elements.

In the prior art, test executive software has not provided users with the ability to effectively test multiple units at the same time using different threads of execution. It would be desirable to provide a system and method for executing a batch of threads simultaneously such that each thread executes an instance of a test sequence to test a unit under test. It would be desirable for each thread to have its own execution flow but to also provide an ability to include batch synchronization sections in the test sequence to synchronize the execution of the threads where necessary.

SUMMARY OF THE INVENTION

One embodiment of the present invention comprises a method for creating a computer program to be executed by a plurality of threads, in which the method utilizes a technique for execution synchronization referred to herein as a batch synchronization section. According to this technique, a plurality of threads may be associated with one another as a "batch" of threads. Each thread in the plurality (batch) of threads may execute the computer program simultaneously. The batch synchronization section may specify a portion of the computer program for which the execution of the portion by the plurality of threads is to be synchronized. For example, the batch synchronization section may specify an enter point and an exit point which together define the portion of the computer program for which execution synchronization is desired. During execution of the program, each thread that arrives at the enter point may block until all other threads in the plurality (batch) of threads have arrived at the enter point.

Once all the threads have arrived at the enter point, one or more threads may execute the program portion between the enter point and exit point and may do so in various orders. In one embodiment, different types of batch synchronization sections may be specified, wherein each type of batch synchronization section specifies a different type of execution synchronization for this portion of the program, as described below. In the preferred embodiment, each thread that arrives at the exit point of the batch synchronization section blocks until all other threads have arrived at the exit point. Each thread may then resume execution of the program from the exit point.

In one embodiment, a batch synchronization section may be specified for the computer program via a graphical user interface (GUI). For example, when using an application development environment application to create the computer program, the user (programmer) may request to specify a batch synchronization section, and the application development environment application may display the GUI in response to this request, e.g., by displaying a new window or dialog box.

User input specifying information for the batch synchronization section may be received via the GUI. For example, a batch synchronization section type may be specified. In one embodiment, the following types of batch synchronization sections are supported: parallel, serial, and one-thread-only. These batch synchronization section types are described below. Other information may also be received, such as an enter point and exit point for the batch synchronization section. The enter and exit points for the batch synchronization section may together specify the portion of the computer program whose execution is to be synchronized with respect to the plurality of threads.

User input specifying functionality for the computer program may be received, including program functionality associated with the batch synchronization section. For example, this may comprise receiving user input specifying source code for the computer program, wherein the source code defines the functionality of the program. A portion of the program functionality may be associated with the batch synchronization section, e.g., by including source code between enter and exit points of the batch synchronization section.

It is noted that the steps of receiving user input specifying information for the batch synchronization section and receiving user input specifying functionality for the computer program may be performed in any of various ways and in various orders. For example, in a typical application the user may begin developing a computer program to be executed by a plurality of threads by providing input specifying source code to implement a first portion of program functionality. During the development process, the user may realize that execution of a second portion of program functionality needs to be synchronized with respect to the plurality of threads. For example, it may be necessary that the second portion of program functionality be executed only once by a single thread (one-thread-only synchronization), or it may be necessary that the second portion of program functionality be executed by one thread at a time (serial synchronization) or by all the threads simultaneously (parallel synchronization).

Thus, the user may specify a batch synchronization section to implement the desired synchronization behavior for the second portion of program functionality. In one embodiment, the user may specify the batch synchronization section via a GUI, as described above. For example, in response to user input indicating a desire to specify the batch synchronization section, a GUI may be displayed. The user may specify a type for the batch synchronization section via the GUI, such as one-thread-only, serial, or parallel, and may then click an "OK" button. In response, a portion of placeholder code to implement the specified type of batch synchronization section may be automatically included in the computer program. For example, the placeholder code may include function calls or other source code defining an enter point and exit point for the batch synchronization section. The user may then fill out this placeholder code, e.g., by inserting the source code for which execution synchronization is desired. Thus, in this example, the enter and exit points for the batch synchronization section may be automatically included in the program, and the user may insert desired source code between the enter and exit points.

In another embodiment, the source code that needs to be included in the batch synchronization section may already be present in the program, and the user may associate this source code with the batch synchronization section, e.g., by using point and click GUI techniques to define the enter and exit points for the batch synchronization section. Source code to implement the enter and exit points for the batch synchronization section may then be automatically included at the indicated locations. Also, in another embodiment, the user may specify the entire batch synchronization section manually, i.e., without aid of a GUI or without any source code being automatically included in the program. For example, the user may manually include source code in the program to implement the enter and exit points for the batch synchronization section.

In response to the user input specifying functionality for the computer program, i.e., after the user has finished writing the program, program instructions (e.g., machine language instructions) implementing the program functionality may be programmatically created, e.g., in response to the user requesting that the program be compiled. The created program instructions are preferably also operable to implement the execution synchronization behavior defined by the batch synchronization section, as described below. A plurality (batch) of threads may then execute the created program instructions.

Each thread in the plurality of threads may execute the program instructions until arriving at the enter point for the batch synchronization section. Upon arriving at the enter point, each thread may block until all other threads in the plurality (batch) of threads arrive at the enter point. For example, the executable instructions for the program may include executable instructions associated with the enter point of the batch synchronization section which cause the threads to block until each thread has arrived at the enter point. In various embodiments, thread blocking may be implemented in any of various ways, e.g., using standard operating system techniques.

Once all threads in the plurality (batch) of threads have arrived at the enter point of the batch synchronization section, execution of the program functionality associated with the batch synchronization section proceeds according to the type specified for the batch synchronization section, e.g., parallel, serial, or one-thread-only. One or more threads may execute this portion of program functionality and in various orders, as described below.

Each of the one or more threads that executes the program functionality associated with the batch synchronization section may block at the exit point of the batch synchronization section until all other threads arrive at the exit point. Once all threads have arrived at the exit point, each thread may then resume execution.

As noted above, in one embodiment the following types of batch synchronization section types may be specified: one-thread-only, serial, or parallel. Once all threads in the plurality (batch) of threads have arrived at the enter point of the batch synchronization section, execution of the program functionality associated with the batch synchronization section may proceed differently, depending on the specified type.

If the batch synchronization section is a one-thread-only batch synchronization section, then exactly one thread may execute the functionality associated with the batch synchronization section. The other threads may skip execution of this portion of the program and may resume execution from the exit point of the batch synchronization section. The determination of which thread executes the functionality associated with the batch synchronization section may be made in various ways. For example, in one embodiment, each thread may be assigned a priority order, e.g., when the threads are created or by calling a function to assign a priority order to each thread, and the thread with the highest priority may be chosen to execute this portion of the program.

If the batch synchronization section is a serial batch synchronization section, then one thread at a time may execute the functionality associated with the batch synchronization section until all the threads in the batch have executed this portion of the program. The determination of the order in which the threads execute the functionality associated with the batch synchronization section may be made in various ways. For example, in one embodiment, each thread may be assigned a priority order, e.g., when the threads are created, and the threads may execute this portion of the program in priority order.

If the batch synchronization section is a parallel batch synchronization section, then all the threads in the plurality (batch) of threads may execute the functionality associated with the batch synchronization section in parallel (simultaneously).

Thus, the method described above enables the creation and execution of a multi-threaded computer program, wherein each thread has its own flow of execution but is synchronized with other threads with respect to one or more portions of the program that are defined by batch synchronization sections. The above-described method may advantageously simplify multi-threaded programming compared to techniques known in the prior art. For example, the user is not required to implement desired synchronization behavior with low-level synchronization constructs such as a rendezvous, mutex or semaphore, is not required to acquire and release synchronization object locks or maintain a count of the number of threads that have acquired a lock, etc. Instead, the plurality of threads may be grouped into a logical batch, and the batch synchronization section(s) of the program may synchronize the execution of each thread in the batch as described above, regardless of how many threads are in the batch. Thus, the number of threads in the batch may be easily changed without having to change the program code implementing the execution synchronization.

Also, the method may provide improved error-handling techniques for multi-threaded programs. For example, if one of the threads in the batch terminates, due either to normal execution flow or an error condition, then the thread is preferably automatically removed from the batch. Thus, when the other threads in the batch have all arrived at the enter point of a batch synchronization section, these threads may then proceed without waiting for the terminated thread.

In one embodiment, a "batch object" may be created to facilitate the management of a batch of threads as described above. For example, as each thread in the plurality (batch) of threads is created, the thread may be associated with or added to the batch object. The method steps described above may use information from the batch object to determine when all the threads in a batch have arrived at the enter or exit points of a batch synchronization section. Also, as threads terminate, they may be automatically removed from the batch object. In one embodiment, the batch object may be an implicit object that is created automatically and does not require management on the part of the user. In another embodiment, the user may include explicit source code in the program to create the batch object, add threads to the batch object, etc. For example, this may enable some threads to be associated with a batch of threads while other threads are independent of the batch, may enable multiple batches of threads to be defined, etc.

The above-described method may be employed to create any of various types of multi-threaded computer programs or computer-implemented processes. The programs or processes may be specified using any of various programming languages, techniques, or software development applications. As described above, test executive software applications are often used to create and control a computer-implemented testing process, e.g., to perform tests of a group of units under test. The following describes one specific application of the above-described method to specify execution synchronization behavior for multiple concurrent executions of a test executive test sequence.

The test sequence may include one or more batch synchronization sections. Multiple threads may each execute an instance of the test sequence to concurrently to test a group of units under test, and the batch synchronization sections may coordinate the execution of the multiple threads where necessary.

A plurality of steps may be included in a test sequence in response to user input. As described above, various steps may reference code modules that are executable to perform desired tests of a unit under test (UUT). A batch synchronization section may be included in the test sequence. In one embodiment, a batch synchronization section may be included in the test sequence by including an enter step, an exit step, and one or more functional steps between the enter and exit step, wherein execution synchronization is required for the one or more functional steps. In the preferred embodiment, the user may utilize a GUI to specify the batch synchronization section. Exemplary GUI dialog boxes are described below. The user may also specify a type for the batch synchronization section. In one embodiment, the user may choose from the above-described batch synchronization section types: one-thread-only, serial, or parallel.

After creating the test sequence, user input indicating a desire to execute the test sequence to simultaneously test a group of units may be received. In response to this user input, a plurality (batch) of threads may be simultaneously executed, wherein each thread executes an instance of the test sequence. Each thread may execute its respective instance of the test sequence until arriving at the enter step of the batch synchronization section and may then block until all other threads in the plurality (batch) of threads arrive at the enter step.

Once all threads in the plurality (batch) of threads have arrived at the enter step of the batch synchronization section, execution of the one or more functional steps in the batch synchronization section proceeds according to the type specified for the batch synchronization section, e.g., parallel, serial, or one-thread-only, similarly as described above. One or more threads may execute the functional steps in the batch synchronization section and in various orders.

Each thread that executes the functional steps in the batch synchronization section may block at the exit step of the batch synchronization section until all other threads in the plurality (batch) of threads arrive at the exit step. Once all threads have arrived at the exit step, each thread resumes its respective execution of the test sequence from the exit step.

Thus, the above-described method may enable a group of units to be tested simultaneously. A separate thread may execute an instance of the test sequence to test each unit, wherein each thread has its own execution flow. For example, different threads may execute different steps of the sequence, e.g., depending on execution results obtained when performing the tests on their respective units. While each thread has an independent execution flow, it may be desirable for certain portions of the test sequence to be synchronized using batch synchronization sections. As one example, if a portion of the test sequence is operable to raise the temperature of a test chamber in which the group of units is being tested, then a one-thread-only batch synchronization section may be included in the test sequence to ensure that only one thread raises the temperature and to ensure that all threads are ready to execute the high-temperature portions of the testing process once the temperature has been raised.

BRIEF DESCRIPTION OF THE DRAWINGS

A better understanding of the present invention can be obtained when the following detailed description of the preferred embodiment is considered in conjunction with the following drawings, in which:

FIG. 7 shows the set of steps for the Test UUTs entry point sequence in the default process model of the TestStand test executive software application;

FIG. 8 shows a list of all the sequences in the default process model of the TestStand test executive software application;

FIGS. 18 and 19 show the set of steps for the Test UUTs entry point in the batch process model of the TestStand test executive software application;

Figure 1:
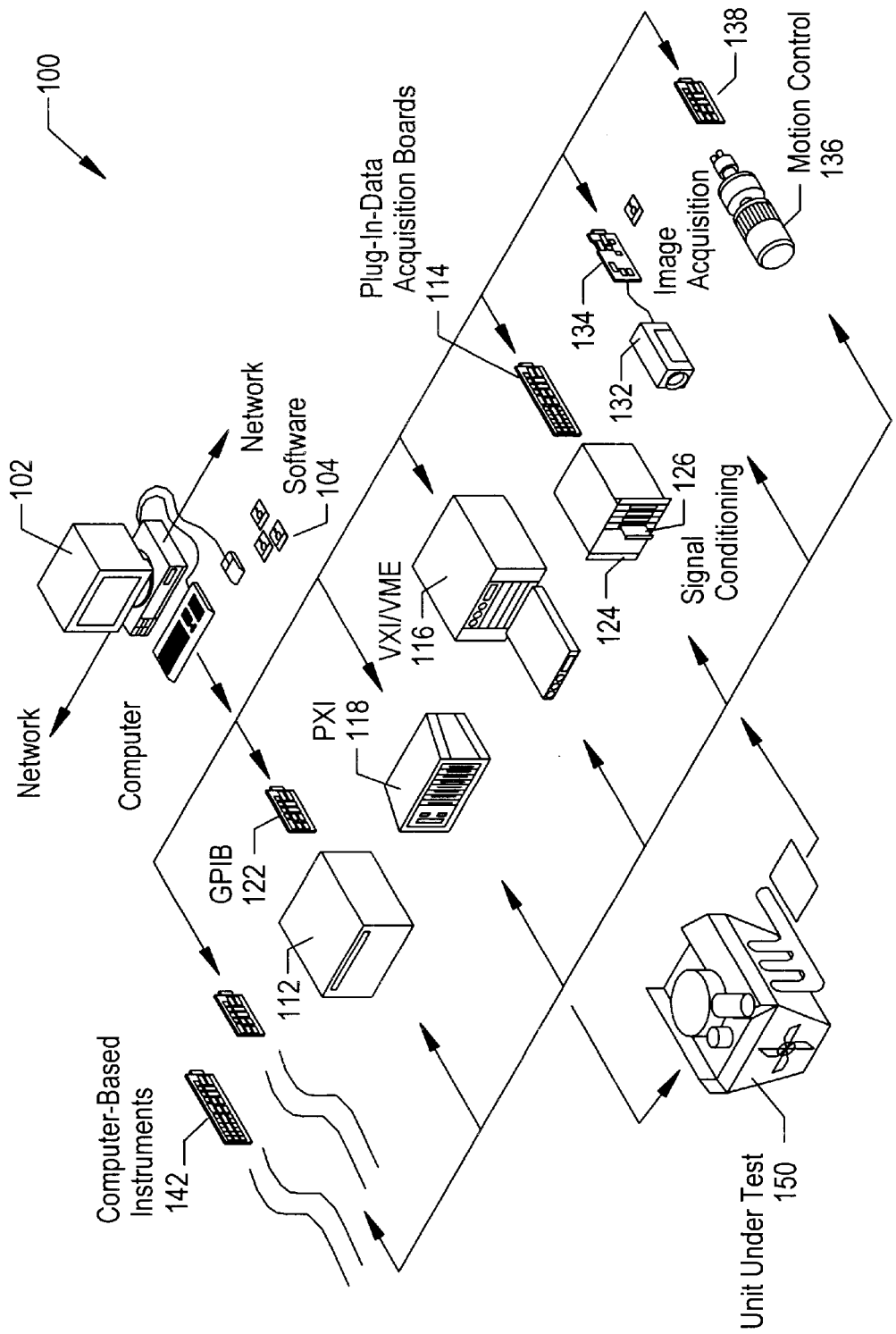
FIG. 1 illustrates an instrumentation control system according to one embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 09/259,162 titled "Test Executive System and Method Including Step Types for Improved Configurability," filed Feb. 26, 1999.

FIG. 1—Instrumentation System

FIG. 1 illustrates an exemplary instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure or control a unit under test (UUT) or process 150. For example, the computer 102 may include a test executive application for performing automated tests of the unit under test. It is noted that FIG. 1 is exemplary only, and various embodiments of the present invention may be used in any of various systems, as desired.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via a GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and optionally interfaces through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. The cards 122, 134, 138 and 114 may also be implemented as external devices coupled to the computer 102, such as through a serial bus.

The VXI chassis or instrument 116 is coupled to the computer 102 via a serial bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. Other types of instruments or devices may be connected to the system, as desired.

The computer system 102 preferably includes a memory medium on which one or more computer programs according to the present invention are stored. The memory medium may store software operable to receive input specifying a batch synchronization section for a computer program and programmatically create program instructions in response to the input, wherein the program instructions are executable to synchronize the execution of a plurality (batch) of threads with respect to the batch synchronization section. Batch synchronization sections are described in detail below. The memory medium may also or alternatively store the programmatically created program instructions, e.g., may store an executable computer program including a batch synchronization section operable to synchronize the execution of multiple threads that execute the program.

In one embodiment, the memory medium may store test executive software for creating and/or controlling an automated test system. The test executive software may allow the user to create, configure, and/or control test sequence execution for various test applications, such as production and manufacturing test applications. For example, the test executive software may interact with instrumentation such as shown in FIG. 1 to test one or more UUTs 150. As described below, the test executive software may provide support for including various types of batch synchronization sections in a test sequence, wherein the batch synchronization section is operable to synchronize multiple concurrent executions of a test sequence.

The term "memory medium" is intended to include an installation media, e.g., a CD-ROM, or floppy disks 104, a computer system memory such as DRAM, SRAM, EDO RAM, etc., or a non-volatile memory such as a magnetic medium, e.g., a hard drive, or optical storage. The host computer CPU executing code and data from the memory medium may comprise a means for receiving user input specifying a batch synchronization section for a computer program and creating program instructions executable to implement the functionality of the computer program, including functionality specified by the batch synchronization section, according to the methods described below. The host computer CPU executing code and data from the memory medium may also comprise a means for multiple threads to execute a program created according to the methods described below.

Figure 2:
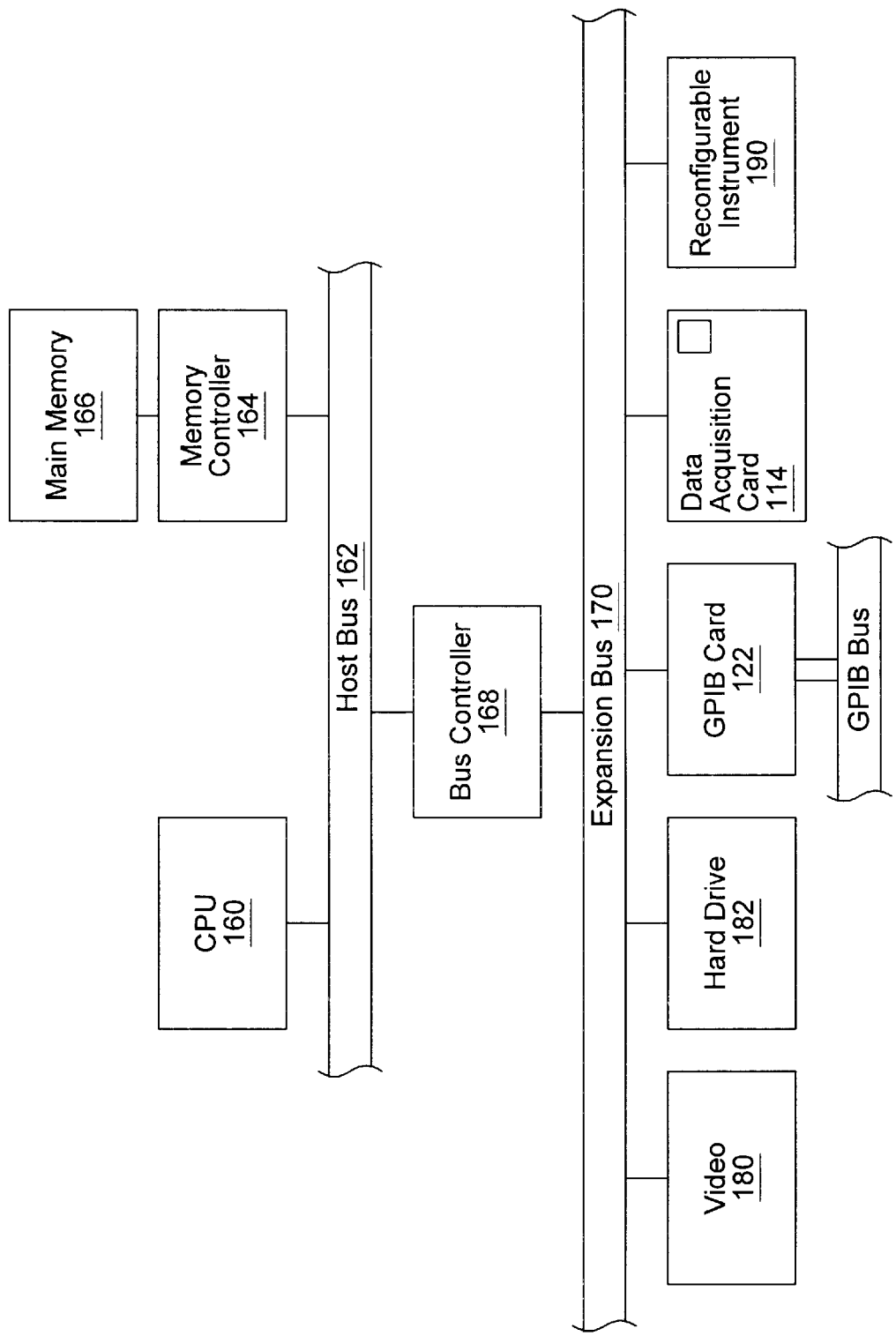
FIG. 2 is a block diagram of the computer system of FIG. 1.

FIG. 2—Computer System Block Diagram

FIG. 2 is a block diagram of the computer system illustrated in FIG. 1. It is noted that any type of computer system configuration or architecture can be used as desired, and FIG. 2 illustrates a representative PC embodiment. It is also noted that the computer system may be a general purpose computer system as shown in FIG. 1, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 102 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store computer programs according to one embodiment of the present invention, such as described above with reference to FIG. 1. The main memory 166 may also store operating system software as well as other software for operation of the computer system, as well known to those skilled in the art. The operation of computer programs stored in the main memory 166 is discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1) and a GPIB interface card 122 which provides a GPIB bus interface to the GPIB instrument 112 (of FIG. 1). The computer 102 further comprises a video display subsystem 180 and hard drive 182 coupled to the expansion bus 170.

As shown, a reconfigurable instrument 190 may also be connected to the computer 102. The reconfigurable instrument 190 may include configurable logic, such as a programmable logic device (PLD), e.g., an FPGA, or a processor and memory, which may execute a real time operating system. Program instructions may be downloaded and executed on the reconfigurable instrument 190. In various embodiments, the configurable logic may be comprised on an instrument or device connected to the computer through means other than an expansion slot, e.g., the instrument or device may be connected via an IEEE 1394 bus, USB, or other type of port. Also, the configurable logic may be comprised on a device such as the data acquisition board 114 or another device shown in FIG. 1.

Figure 3:
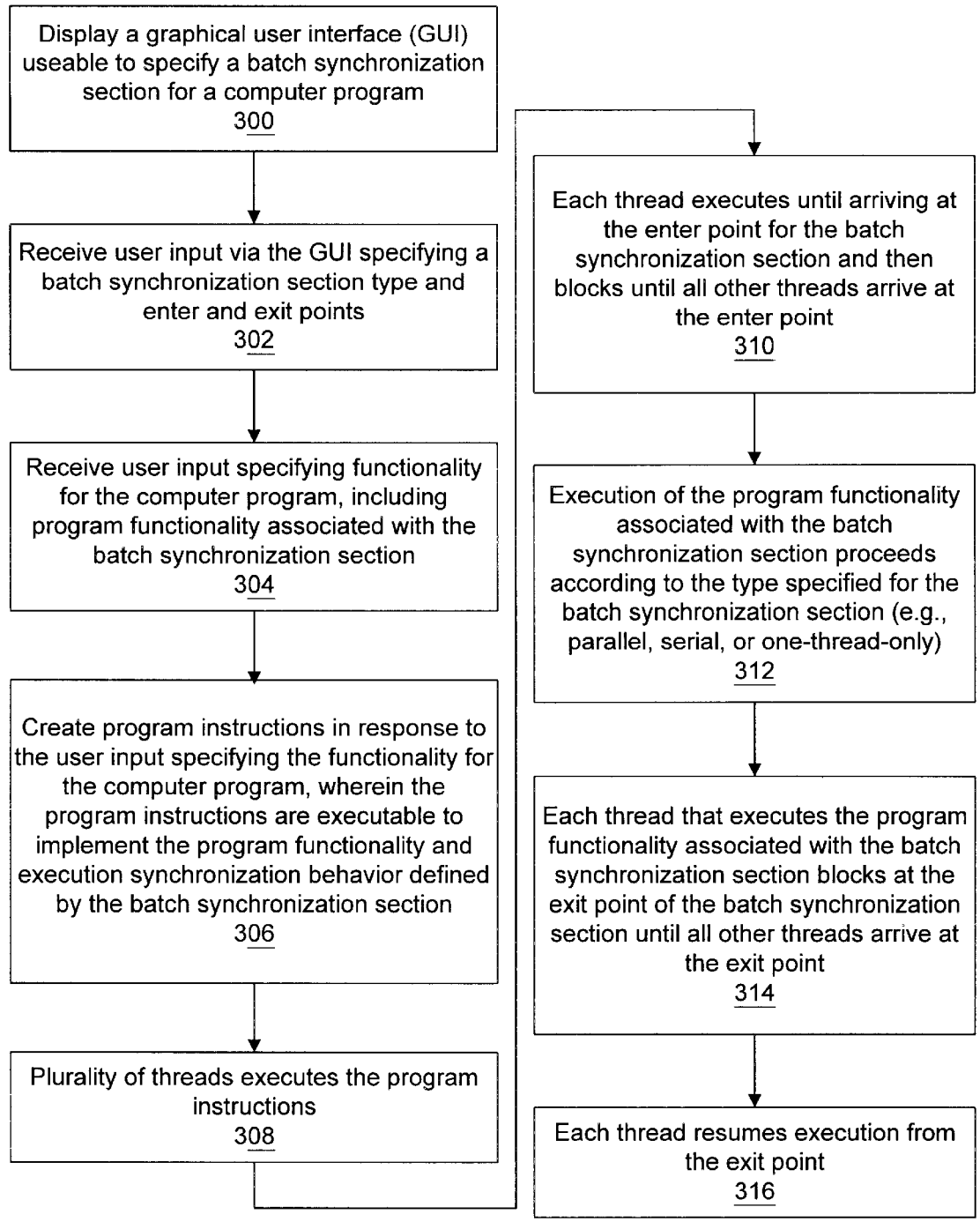
FIG. 3 is a flowchart diagram illustrating one embodiment of a method for creating a computer program to be executed by a plurality of threads, in which the method utilizes a technique for execution synchronization referred to herein as a batch synchronization section.

FIG. 3—Method for Creating a Computer Program to be Executed by a Plurality of Threads FIG. 3 is a flowchart diagram illustrating one embodiment of a method for creating a computer program to be executed by a plurality of threads. The method of FIG. 3 utilizes a technique for execution synchronization referred to herein as a "batch synchronization section". According to this technique, a plurality of threads may be associated with one another as a "batch" of threads. Each thread in the plurality (batch) of threads may execute the computer program simultaneously. It is noted that in the context of a uniprocessor system, the threads executing simultaneously may refer to techniques in which the processor executes only one thread at a time but the threads appear to be executing simultaneously, e.g., through the use of multitasking or time slice techniques. For multiprocessor systems, multiple threads may literally execute simultaneously.

The batch synchronization section may specify a portion of the computer program for which the execution of the portion by the plurality of threads is to be synchronized. In one embodiment different types of batch synchronization sections may be specified, wherein each type of batch synchronization section performs a different type of execution synchronization, as described below.

In step 300, a graphical user interface (GUI) useable to specify a batch synchronization section for the computer program may be displayed. For example, when using an application development environment application to create the computer program, the user (programmer) may request to specify a batch synchronization section, and the application development environment application may display the GUI in response to this request, e.g., by displaying a new window or dialog box.

In step 302, user input specifying information for the batch synchronization section may be received via the GUI. For example, a batch synchronization section type may be specified. In one embodiment, the following types of batch synchronization sections are supported: parallel, serial, and one-thread-only. These batch synchronization section types are described below. Other information may also be received in step 302, such as an enter point and exit point for the batch synchronization section. The enter and exit points for the batch synchronization section may together specify the portion of the computer program whose execution is to be synchronized with respect to the plurality of threads.

In step 304, user input specifying functionality for the computer program may be received, including program functionality associated with the batch synchronization section. For example, step 304 may comprise receiving user input specifying source code for the computer program, wherein the source code defines the functionality of the program. A portion of the program functionality may be associated with the batch synchronization section, e.g., by including source code between enter and exit points of the batch synchronization section. In a text-based programming environment, the user input specifying source code for the computer program may comprise the user typing text of a programming language (e.g., C, C++, Visual Basic, Pascal, Java, etc), or otherwise specifying the text, e.g., by utilizing menu options to include the text in the program. In other types of programming environments, such as visual or graphical programming environments, the source code for the program may be specified in any of various other ways.

It is noted that steps 300–304 may be performed in any of various ways and in various orders. For example, in a typical application the user may begin developing a computer program to be executed by a plurality of threads by providing input specifying source code to implement a first portion of program functionality. During the development process, the user may realize that execution of a second portion of program functionality needs to be synchronized with respect to the plurality of threads. For example, it may be necessary that the second portion of program functionality be executed only once by a single thread (one-thread-only synchronization), or it may be necessary that the second portion of program functionality be executed by one thread at a time (serial synchronization) or by all the threads simultaneously (parallel synchronization).

Thus, the user may specify a batch synchronization section to implement the desired synchronization behavior for the second portion of program functionality. In one embodiment, the user may specify the batch synchronization section via a GUI, as described above. For example, in response to user input indicating a desire to specify the batch synchronization section, a GUI may be displayed. The user may specify a type for the batch synchronization section via the GUI, such as one-thread-only, serial, or parallel, and may then click an "OK" button. In response, a portion of placeholder code to implement the specified type of batch synchronization section may be automatically included in the computer program. For example, the placeholder code may include function calls or other source code defining an enter point and exit point for the batch synchronization section. The user may then fill out this placeholder code, e.g., by inserting the source code for which execution synchronization is desired. Thus, in this example, the enter and exit points for the batch synchronization section may be automatically included in the program, and the user may insert desired source code between the enter and exit points.

In another embodiment, the source code that needs to be included in the batch synchronization section may already be present in the program, and the user may associate this source code with the batch synchronization section, e.g., by using point and click GUI techniques to define the enter and exit points for the batch synchronization section. Source code to implement the enter and exit points for the batch synchronization section may then be automatically included at the indicated locations. Also, in another embodiment, the user may specify the entire batch synchronization section manually, i.e., without aid of a GUI or without any source code being automatically included in the program. For example, the user may manually include source code in the program to implement the enter and exit points for the batch synchronization section.

It is noted that various embodiments of the above-described steps may also be employed to create programs having batch synchronization sections wherein the programs are not written using traditional text-based programming languages such as C, C++, Basic, etc. For example, in one embodiment a program may be specified using a GUI editor to visually link together nodes or icons representing software modules or components. In this example, the batch synchronization section may group together a set of components for which execution synchronization by a batch of threads executing the set of components is desired. For example, the user may use the GUI to draw a box around the set of components such that one side of the box indicates an enter point for the batch synchronization section and another side indicates an exit point, or the user may display a node or icon representing the batch synchronization section and may drag and drop components into this batch synchronization section icon.

In another embodiment, a computer program may be specified as a plurality of steps included in a sequence or script, wherein each step references a code module. In this embodiment, a batch synchronization section may be specified by grouping together a set of steps for which execution synchronization is desired, e.g., by including an enter and exit step which together define the boundaries of the batch synchronization section. One such example is described below with reference to a test executive software application.

In another embodiment, the computer program may be a graphical program, such as a graphical program created using a graphical programming development environment such as LabVIEW, Diadem and DasyLab from National Instruments, VEE from Agilent, SoftWIRE from Measurement Computing, Simulink from The MathWorks, and Vis-Sim from Visual Solutions, among others. For example the graphical program may include a block diagram having nodes connected in one or more of a data flow, control flow, and/or execution flow format. In this embodiment, the user may graphically indicate portions of the block diagram for which execution synchronization by a batch of threads executing the graphical program is desired. For example, the user may indicate a location in the block diagram specifying an enter point where any thread executing the program should block until all other threads in the batch have arrived at that point, and may also indicate an exit point in a similar manner.

In response to the user input specifying functionality for the computer program, i.e., after the user has finished writing the program, program instructions implementing the program functionality may be programmatically created in step 306, e.g., in response to the user requesting that the program be compiled. The created program instructions are preferably also operable to implement the execution synchronization behavior defined by the batch synchronization section, as described below.

In step 308, a plurality (batch) of threads may execute the program instructions created in step 306. In one embodiment, the program instructions created in step 306 may specify the creation of the plurality of threads. Thus, the individual threads may be created in response to executing the program. In another embodiment, the program instructions created in step 306 may be executed under control of a manager program, e.g., within the execution environment of an application development environment. In this case, the manager program may be responsible for creating the plurality of threads and may cause each thread to execute the program instructions created in step 306.

As shown in step 310, each thread in the plurality of threads may execute the program instructions until arriving at the enter point for the batch synchronization section. Upon arriving at the enter point, each thread may block until all other threads in the plurality (batch) of threads arrive at the enter point. For example, the executable instructions for the program may include executable instructions associated with the enter point of the batch synchronization section which cause the threads to block until each thread has arrived at the enter point. In various embodiments, thread blocking may be implemented in any of various ways, e.g., using standard operating system techniques.

Figure 4:
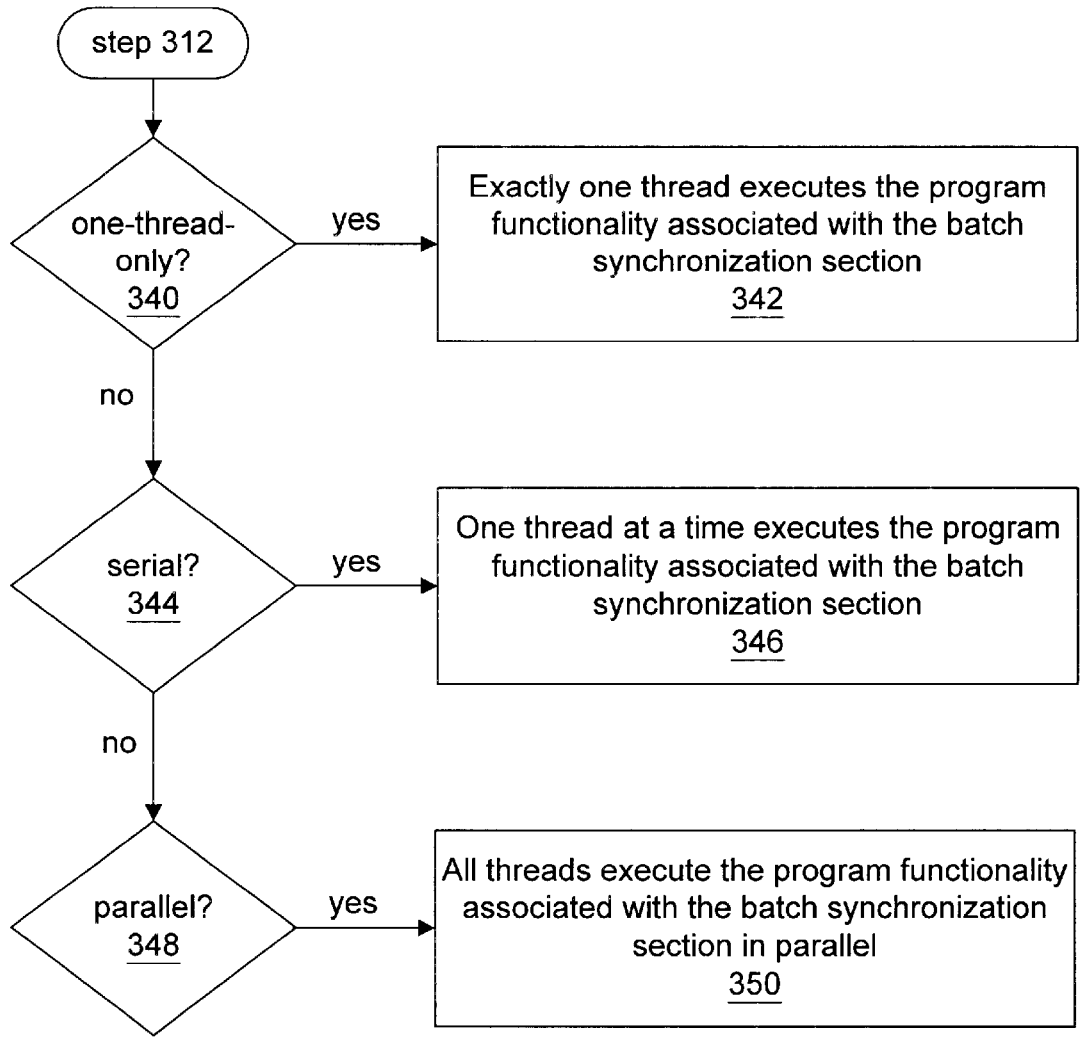
FIG. 4 is a flowchart diagram illustrating execution of the program functionality associated with a batch synchronization section for different types of batch synchronization sections.

As shown in step 312, once all threads in the plurality (batch) of threads have arrived at the enter point of the batch synchronization section, execution of the program functionality associated with the batch synchronization section proceeds according to the type specified for the batch synchronization section, e.g., parallel, serial, or one-thread-only. One or more threads may execute this portion of program functionality and in various orders. FIG. 4 is a flowchart diagram illustrating execution of this portion of program functionality for different types of batch synchronization sections.

As shown in step 314, each of the one or more threads that executes the program functionality associated with the batch synchronization section may block at the exit point of the batch synchronization section until all other threads arrive at the exit point. Once all threads have arrived at the exit point, each thread may then resume execution, as shown in step 316.

Referring now to FIG. 4, various embodiments of step 312 are illustrated. As noted above, in one embodiment the following types of batch synchronization section types may be specified: one-thread-only, serial, or parallel. Once all threads in the plurality (batch) of threads have arrived at the enter point of the batch synchronization section, execution of the program functionality associated with the batch synchronization section may proceed differently, depending on the specified type.

If the batch synchronization section is a one-thread-only batch synchronization section, then exactly one thread may execute the functionality associated with the batch synchronization section, as shown in steps 340 and 342. The other threads may skip execution of this portion of the program and may resume execution from the exit point of the batch synchronization section. The determination of which thread executes the functionality associated with the batch synchronization section may be made in various ways. For example, in one embodiment, each thread may be assigned a priority order, e.g., when the threads are created or by calling a function to assign a priority order to each thread, and the thread with the highest priority may be chosen to execute this portion of the program.

If the batch synchronization section is a serial batch synchronization section, then one thread at a time may execute the functionality associated with the batch synchronization section until all the threads in the batch have executed this portion of the program, as shown in steps 344 and 346. The determination of the order in which the threads execute the functionality associated with the batch synchronization section may be made in various ways. For example, in one embodiment, each thread may be assigned a priority order, e.g., when the threads are created, and the threads may execute this portion of the program in priority order.

If the batch synchronization section is a parallel batch synchronization section, then all the threads in the plurality (batch) of threads may execute the functionality associated with the batch synchronization section in parallel (simultaneously), as shown in steps 348 and 350. Similarly as noted above, in the context of a uniprocessor system, the threads executing the functionality associated with the batch synchronization section in parallel may refer to techniques in which the processor executes only one thread at a time but the threads appear to be executing simultaneously, e.g., through the use of multitasking or time slice techniques. For multiprocessor systems, multiple threads may literally execute this portion of the program simultaneously.

Thus, the method described above enables the creation and execution of a multi-threaded computer program, wherein each thread has its own flow of execution but is synchronized with other threads with respect to one or more portions of the program that are defined by batch synchronization sections. The above-described method may advantageously simplify multi-threaded programming compared to techniques known in the prior art. For example, the user is not required to implement desired synchronization behavior with low-level synchronization constructs such as a rendezvous, mutex or semaphore, is not required to acquire and release synchronization object locks or maintain a count of the number of threads that have acquired a lock, etc. Instead, the plurality of threads may be grouped into a logical batch, and the batch synchronization section(s) of the program may synchronize the execution of each thread in the batch as described above, regardless of how many threads are in the batch. Thus, the number of threads in the batch may be easily changed without having to change the program code implementing the execution synchronization.

Also, the method may provide improved error-handling techniques for multi-threaded programs. For example, if one of the threads in the batch terminates, due either to normal execution flow or an error condition, then the thread is preferably automatically removed from the batch. Thus, when the other threads in the batch have all arrived at the enter point of a batch synchronization section, these threads may then proceed without waiting for the terminated thread.

In one embodiment, a "batch object" may be created to facilitate the management of a batch of threads as described above. For example, as each thread in the plurality (batch) of threads is created, the thread may be associated with or added to the batch object. The method steps described above may use information from the batch object to determine when all the threads in a batch have arrived at the enter or exit points of a batch synchronization section. Also, as threads terminate, they may be automatically removed from the batch object. In one embodiment, the batch object may be an implicit object that is created automatically and does not require management on the part of the user. In another embodiment, the user may include explicit source code in the program to create the batch object, add threads to the batch object, etc. For example, this may enable some threads to be associated with a batch of threads while other threads are independent of the batch, may enable multiple batches of threads to be defined, etc.

The above-described method may be employed to create any of various types of multi-threaded computer programs or computer-implemented processes. The programs or processes may be specified using any of various programming languages or techniques. As described above, test executive software applications are often used to create and control a computer-implemented testing process, e.g., to perform tests of a group of units under test. The following sections describe one specific application of the above-described method to specify execution synchronization behavior for multiple concurrent executions of a test executive test sequence.

Test Executive Software Components

Figure 5:
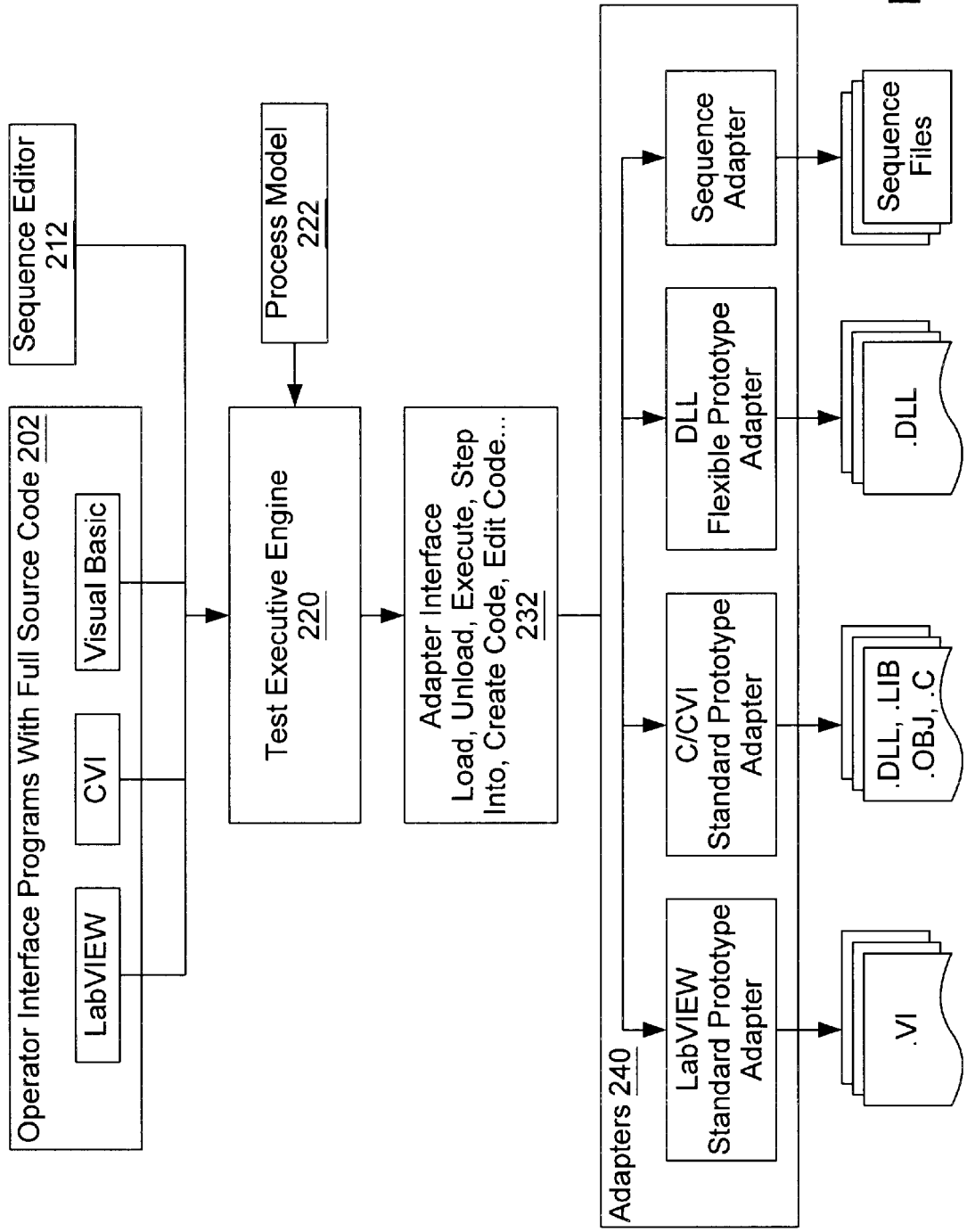
FIG. 5 is a block diagram illustrating high-level architectural relationships between elements of one embodiment of a test executive software application.

FIG. 5 is a block diagram illustrating high-level architectural relationships between elements of one embodiment of a test executive software application, the TestStand test executive product from National Instruments Corp. For more information on the TestStand test executive, please refer to the TestStand documentation available from National Instruments Corp. It is noted that FIG. 5 is exemplary, and embodiments of the present invention may be utilized in conjunction with any of various test executive software applications.

As shown, the test executive software of FIG. 5 includes operator interface programs 202 for interfacing to various software programs. The operator interface programs 202 shown in FIG. 5 are for interfacing to the LabVIEW, LabWindows CVI, and Visual Basic programs. However, additional operator interface programs 202 may be included for interfacing to other programs.

The test executive software of FIG. 5 also includes a sequence editor 212 for editing test sequences. The sequence editor 212 and the operator interface programs 202 interface to the test executive engine 220. One or more process models 222 couple to the test executive engine 220. Process models are described below. The test executive engine 220 interfaces through an adapter interface 232 to one or more adapters 240. The adapters shown in FIG. 5 include the LabVIEW standard prototype adapter, the C/CVI prototype adapter, the DLL flexible prototype adapter, and the sequence adapter. The LabVIEW standard prototype adapter interfaces to programs having a VI extension, i.e., LabVIEW graphical programs. The C/CVI prototype adapter interfaces to programs having a .dll, lib, .obj, or .c extension. The DLL flexible prototype adapter interfaces to programs having a .dll extension. The sequence adapter interfaces to sequence file programs.

As shown in FIG. 5, the test executive engine 220 plays a pivotal role in the test executive architecture. The test executive engine 220 runs test sequences. Sequences comprise steps that can call external code modules. By using module adapters 240 that have the standard adapter interface 232, the test executive engine 220 can load and execute different types of code modules. Test executive sequences can call sub-sequences through the common adapter interface 232. The test executive may use a special type of sequence called a process model to direct the high-level sequence flow. In one embodiment, the test executive engine 220 exports an ActiveX Automation API used by the sequence editor 212 and run-time operator interfaces 202.

Test Executive Sequence Editor

The sequence editor 212 is an application program in which the user creates, modifies, and debugs sequences. The sequence editor 212 may provide the user easy access to the test executive features, such as step types and process models. The sequence editor 212 may include debugging tools found in application development environments such as LabVIEW, LabWindows/CVI, and Microsoft Visual C/C++. These may include features such as breakpoints, single stepping, stepping into or over function calls, tracing, a variable display, and a watch window.

In one embodiment, in the sequence editor 212, the user may start multiple concurrent executions. Multiple instances of the same sequence can be executed, and different sequences can be executed at the same time. Each execution instance may have its own execution window. In trace mode, the execution window displays the steps in the currently executing sequence. When execution is suspended, the execution window may display the next step to execute and provide single-stepping options. As described below, the user may utilize the sequence editor 212 to interactively create a test sequence which includes batch synchronization steps to coordinate multiple concurrent executions of the sequence.

Test Executive Engine

The test executive engine 220 may be used for creating, editing, executing, and debugging sequences. The test executive engine 220 may also provide an application programming interface (API) that enables another program to interface with the test executive engine 220 in order to perform these actions. In one embodiment, the test executive engine 220 comprises a set of DLLs that export an object-based or component-based API, preferably an ActiveX Automation API. The sequence editor 212 and run-time operator interfaces 202 may use the Test Executive Engine API (Engine API). In one embodiment, the Engine API may be called from any programming environment that supports access to ActiveX Automation servers. Thus, the Engine API may be called from test modules, including test modules that are written in LabVIEW and LabWindows/CVI, Visual C++, etc.

Process Models

Testing a Unit Under Test (UUT) typically requires more than just executing a set of tests. It is usually desirable for the test executive to perform a series of operations before and after executing the sequence that performs the tests. Common operations include identifying the UUT, notifying the operator of pass/fail status, generating a test report, logging results, etc. These operations define the testing process, and the set of such operations and their flow of execution is referred to herein as a process model. Some test executives implement their process models internally and do not allow the user to modify them. Other test executives do not define a process model at all. Other test executives, such as TestStand, come with a default process model that the user can modify or replace.

Having a process model enables the user to write different test sequences without repeating standard testing operations in each test sequence. The ability to modify the process model enables users to account for differences in testing processes, such as differences based on variations in the user's production line, the user's production site, or the systems and practices of the user's company. In one embodiment, the test executive may provide a mechanism for defining a process model in the form of a sequence file. The user may edit the process model just as the user edits other sequences. The test executive may provide a default process model. For custom process models, the user may write a new process model, or the user may copy the default process model and then modify it.

Station Model

In one embodiment, the user can select a process model file to use for all sequence files. This process model file is referred to herein as the station model file. The user can use the Station Options dialog box to select a different station model. The user also can use the Station Options dialog box to allow individual sequence files to specify their own process model file, if desired.

Main Sequence and Client Sequence File

In the TestStand test executive, the sequence that initiates the tests on a UUT is called the main sequence. The user must name each main sequence MainSequence. When the user creates a new sequence file, TestStand automatically inserts a MainSequence sequence in the file. The process model invokes the main sequence as part of the overall testing process. The process model defines what is constant about the user's testing process, whereas main sequences define the steps that are unique to the different types of tests the user runs. When the user begins an execution, the user usually does so from a main sequence in one of the user's sequence files. TestStand determines which process model file to use with the main sequence. TestStand uses the station model file unless the sequence file specifies a different process model file and the user sets the Station Options to allow sequence files to override the user's station model setting. After TestStand identifies the process model to use with a main sequence, the file that contains the main sequence becomes a client sequence file of the process model.

Model Callbacks

By default, each main sequence the user executes uses the process model that the user selects for the entire test station. TestStand has a mechanism called a model callback that allows the sequence developer to customize the behavior of a process model for each main sequence that uses it. By defining one or more model callbacks in a process model, the user specifies the set of process model operations that the sequence developer can customize.

The user may define a model callback by adding a sequence to the process model file, marking it as a callback, and calling it from the process model. The sequence developer can override the callback in the model sequence file by using the Sequence File Callbacks dialog box to create a sequence of the same name in the client sequence file. For example, the default TestStand process model defines a TestReport callback that generates the test report for each UUT. Normally, the TestReport callback in the default process model file is sufficient because it handles many types of test results. The sequence developer can, however, override the default TestReport callback by defining a different TestReport callback in a particular client sequence file.

Process models use callbacks to invoke the main sequence in the client sequence file. Each client sequence file defines a sequence by the name of MainSequence. The process model contains a MainSequence callback that is merely a placeholder. The MainSequence in the client sequence file overrides the MainSequence placeholder in the model file. To alter the behavior of the process model for all sequences, the user can modify the process model or replace it entirely. To redefine the set of customizable operations, the user can define new callbacks in, or delete existing callbacks from, the process model file.

Entry Points

A TestStand process model defines a set of entry points. Each entry point is a sequence in the process model file. The user marks a sequence in the model file as an entry point in the Sequence Properties dialog box. By defining multiple entry points in a process model, the user gives the test station operator different ways to invoke a main sequence. For example, the default TestStand process model provides two entry points: Test UUTs and Single Pass. The Test UUTs entry point initiates a loop that repeatedly identifies and tests UUTs. The Single Pass entry point tests a single UUT without identifying it. Such entry points are called execution entry points. Execution entry points appear in the Execute menu of the TestStand sequence editor or operator interface when the active window contains a non-model sequence file that has a MainSequence callback.

Figure 6:
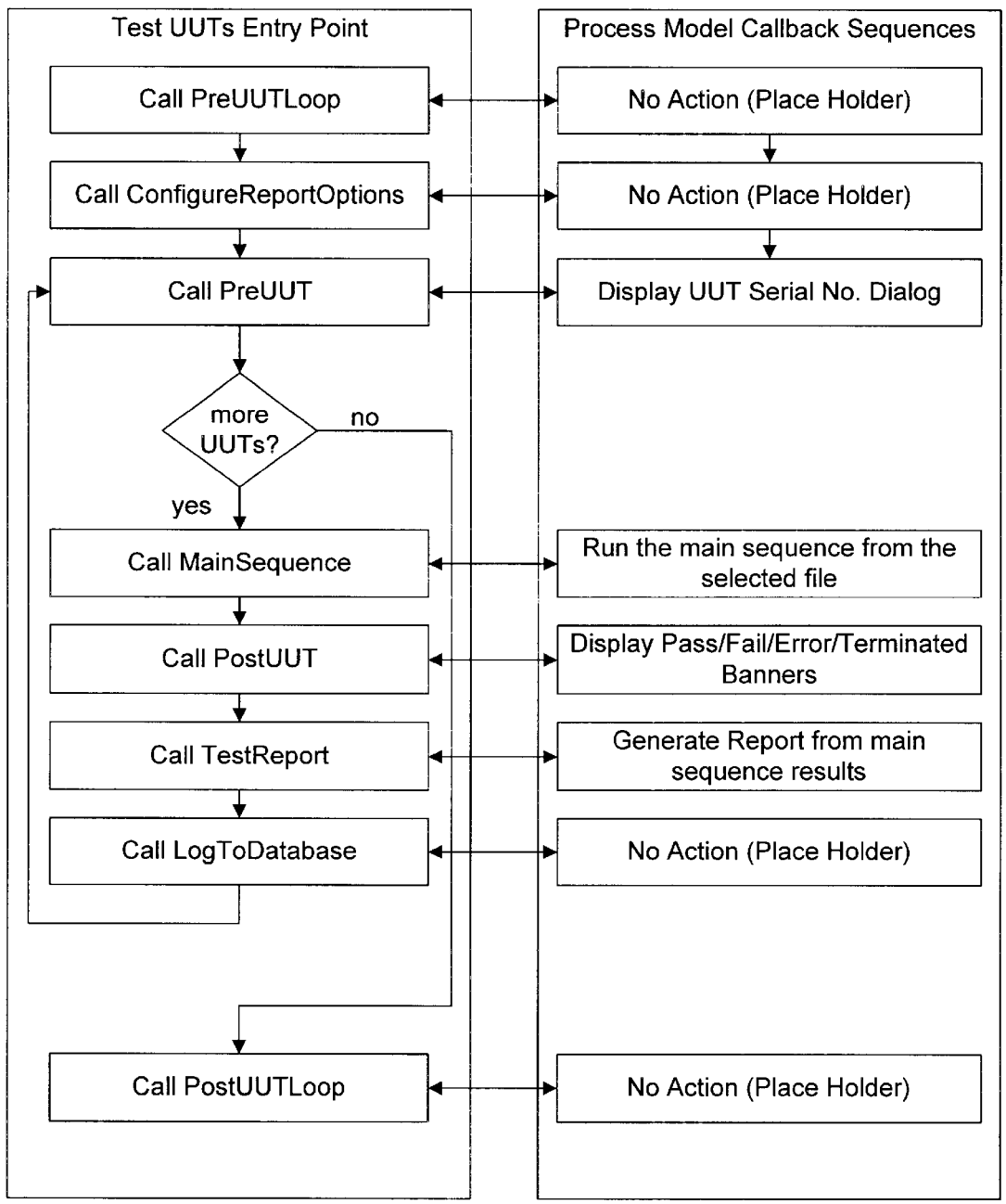
FIG. 6 is a flowchart illustrating major operations of the Test UUTs entry point sequence in the default process model of the TestStand test executive software application.

FIG. 6 illustrates a flowchart of the major operations of the Test UUTs entry point sequence in the default TestStand process model. Notice that the sequence implements many of its operations as callbacks. The box on the left shows the flow of control. The box on the right shows the action that each callback in the default model performs if the user does not override it. Like any other sequence, the sequence for a process model entry point can contain calls to DLLs, calls to subsequences, Goto steps, and so on.

Figure 7:
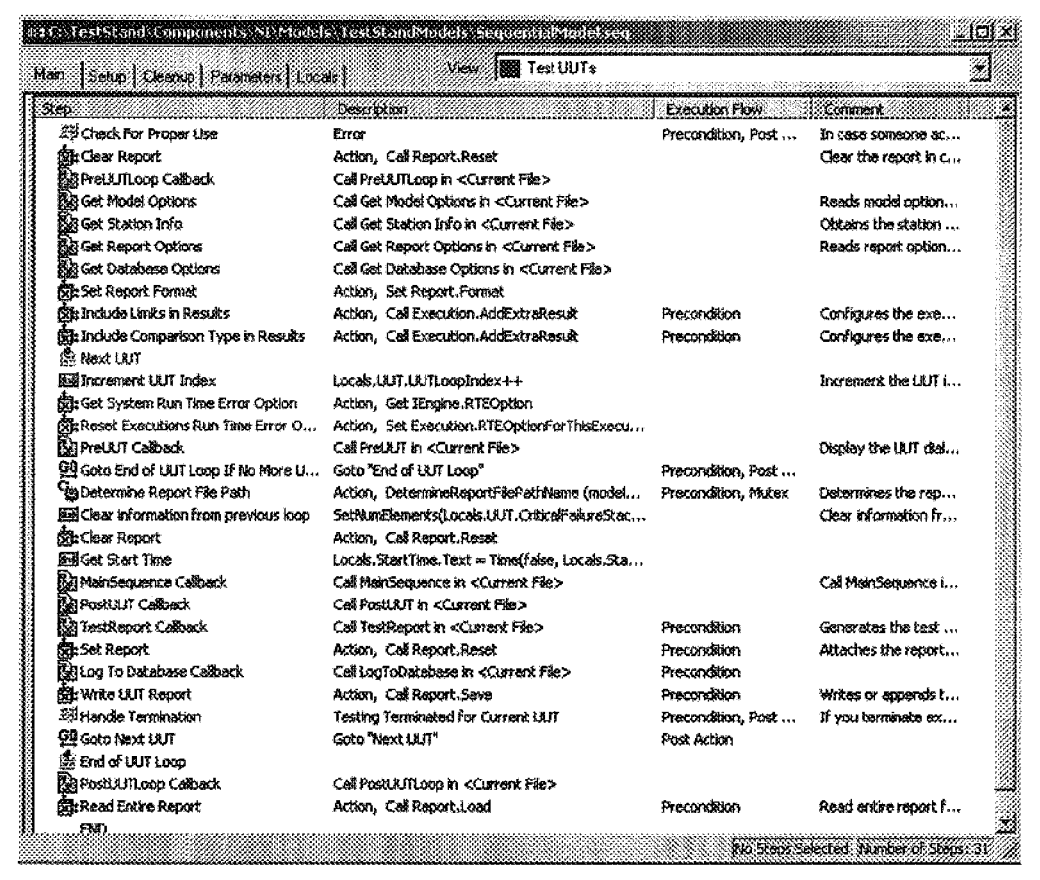

FIG. 7 shows the entire set of steps for the Test UUTs entry point in the default TestStand process model. The user can execute a sequence without a process model by selecting the Run Sequence Name item in the Execute menu, where Sequence Name is the name of the sequence the user is currently viewing. This option is useful for debugging. It executes the sequence directly, skipping the process model operations such as UUT identification and test report generation. The user can execute any sequence this way, not just main sequences. A process model can define other types of entry points, such as configuration entry points. An example is the Config Report Options entry point, which appears as Report Options in the Configure menu of the sequence editor or run-time operator interface.

Figure 8:
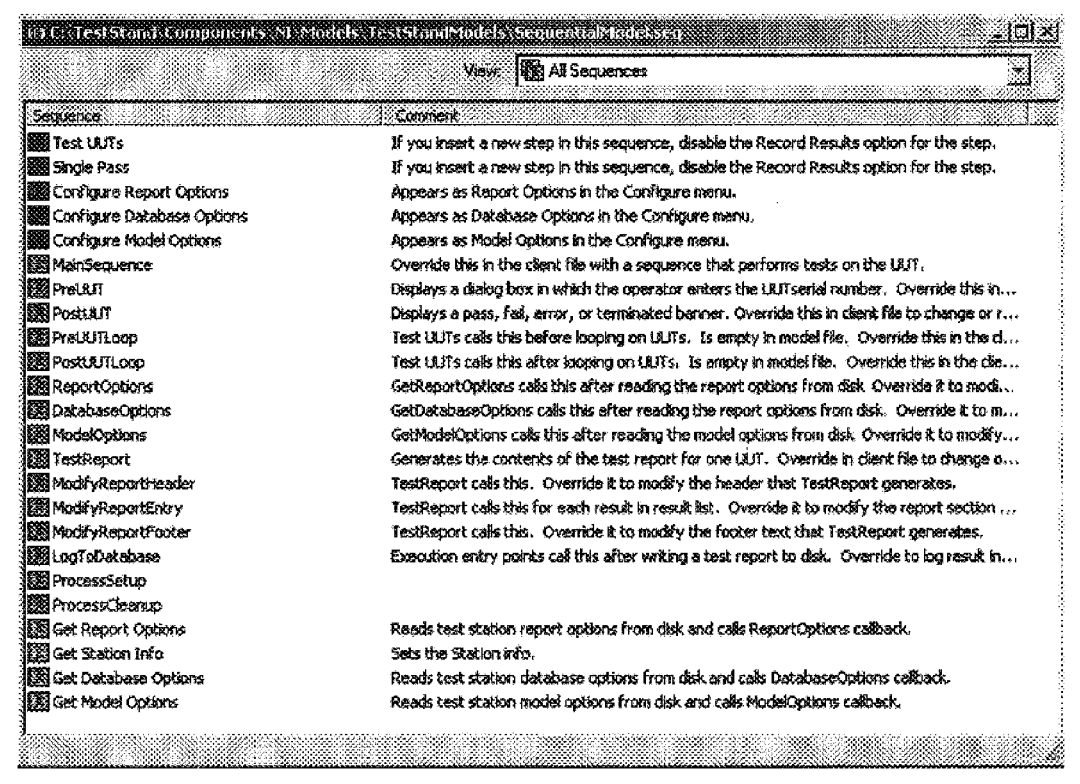

FIG. 8 shows a list of all the sequences in the default TestStand process model. The first three sequences are entry points. The last sequence is a utility subsequence that the execution entry points call. The other sequences are callbacks that the user can override in a client sequence file.

Sequence Executions

When the user runs a sequence, TestStand creates an execution object. The execution object contains all the information that TestStand needs to run the user's sequence and the subsequences it calls. While an execution is active, the user can start another execution by running the same sequence again or by running a different one. TestStand does not limit the number of executions the user can run concurrently. Each execution runs in a different thread. Usually, the TestStand sequence editor creates a new window for each execution. This window is called an Execution window. In the Execution window, the user can view steps as they execute, the values of variables and properties, and the test report. Usually, run-time operator interface programs also have a view or window for each execution.

Normal and Interactive Executions

The user can start an execution in the sequence editor by selecting the Run Sequence Name item or one of the process model entry points from the Execute menu. This is called a normal execution.

The user can run steps in interactive mode by selecting one or more steps and choosing the Run Selected Steps or Loop Selected Steps items in the context menu. In interactive mode, only the selected steps in the sequence execute, regardless of any branching logic that the sequence contains. The selected steps run in the order in which they appear in the sequence. The user can run steps in interactive mode from two different contexts.

The user can run steps interactively from a Sequence File window. When the user does so, the user creates a new execution. This is called a root interactive execution. The user can set station options to control whether the Setup and Cleanup step groups of the sequence run as part of a root interactive execution. Root interactive executions do not invoke process models. Thus, by default, root interactive executions do not generate test reports.

The user also can run steps interactively from an existing Execution window for a normal execution that is suspended at a breakpoint. The user can run steps only in the sequence and step group in which execution is suspended. When the user does this, the selected steps run within the context of the normal execution. This is called a nested interactive execution. The steps that the user runs interactively can access the variable values of the normal execution and add to its results. When the selected steps complete, the execution returns to the step at which it was suspended when the user chose Run Selected Steps or Loop Selected Steps.

Terminating and Aborting Executions

The menus in the sequence editor and run-time operator interfaces have commands that allow the user to stop execution before the execution has completed normally. The TestStand engine API has corresponding methods that allow the user to stop execution from a code module. The user can stop one execution or all executions. The user can issue the stop request at any time, but it does not take effect in each execution until the currently executing code module returns control. The user can stop executions in two ways. When the user terminates an execution, all the Cleanup step groups in the sequences on the call stack run before execution ends. Also, the process model can continue to run. Depending on the process model, it might continue testing with the next UUT or generate a test report. When the user aborts an execution, the Cleanup step groups do not run, and process model cannot continue. In general, it is better to terminate execution so that the Cleanup step groups can return the user's system to a known state. The user aborts an execution when he wants the execution to stop completely as soon as possible. Usually, the user aborts an execution only when debugging and sure that is safe to not run the cleanup steps for a sequence.

Figure 9:
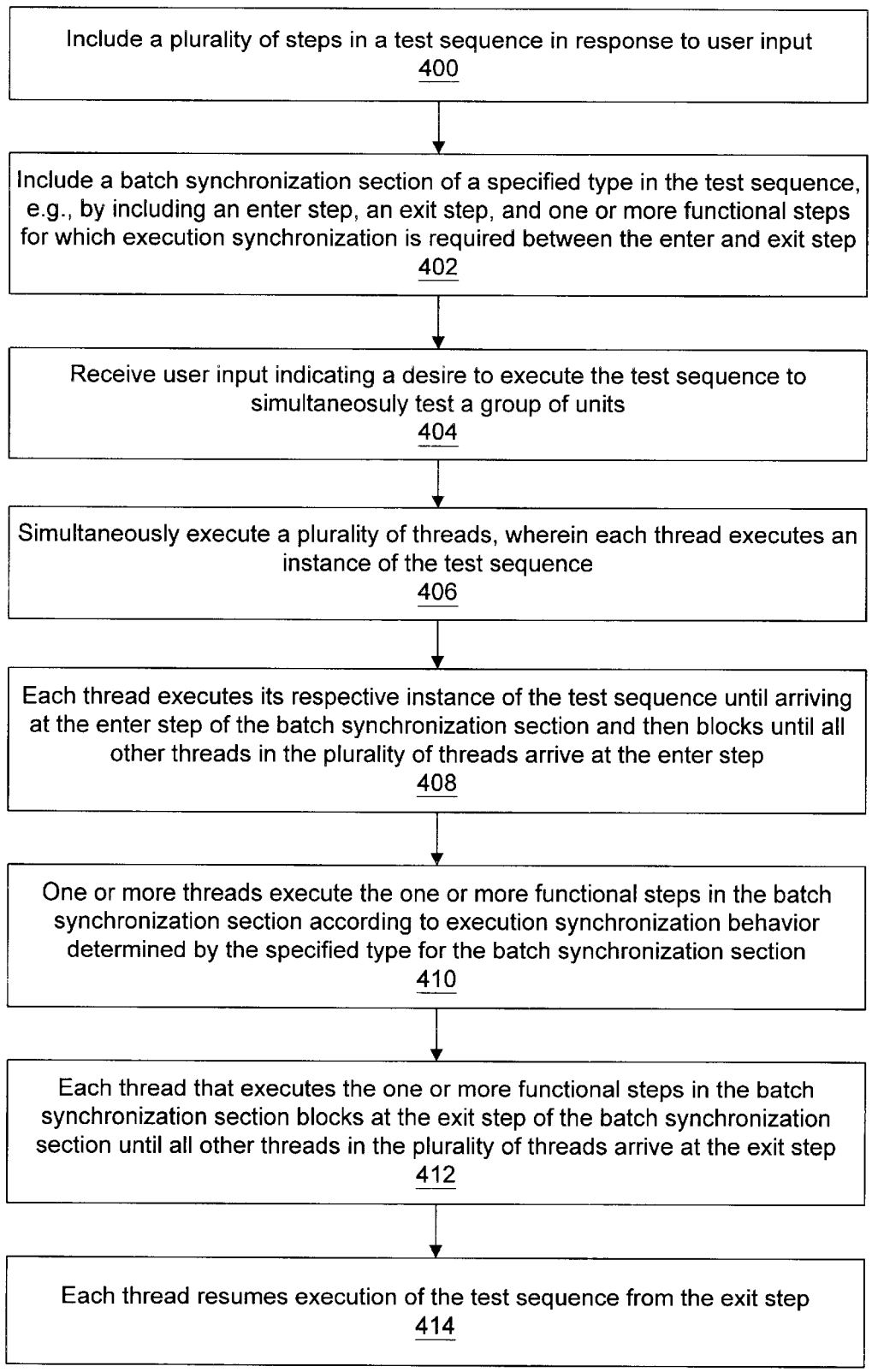
FIG. 9 is a flowchart diagram illustrating one embodiment of a method for simultaneously executing multiple instances of a test sequence, in which the test sequence includes one or more batch synchronization sections.

FIG. 9—Method for Simultaneously Executing Multiple Instances of a Test Sequence FIG. 9 is a flowchart diagram illustrating one embodiment of a method for simultaneously executing multiple instances of a test sequence. The test sequence may include one or more batch synchronization sections. Multiple threads may each execute an instance of the test sequence to simultaneously test a group of units under test, and the batch synchronization sections may coordinate the execution of the multiple threads where necessary. It is noted that in the context of a uniprocessor system, the threads executing simultaneously may refer to techniques in which the processor executes only one thread at a time but the threads appear to be executing simultaneously, e.g., through the use of multitasking or time slice techniques. For multiprocessor systems, multiple threads may literally execute simultaneously.

In step 400, a plurality of steps may be included in a test sequence in response to user input. As described above, various steps may reference code modules that are executable to perform desired tests of a unit under test (UUT).

As shown in step 402, a batch synchronization section may be included in the test sequence. In one embodiment, a batch synchronization section may be included in the test sequence by including an enter step, an exit step, and one or more functional steps between the enter and exit step, wherein execution synchronization is required for the one or more functional steps. In the preferred embodiment, the user may utilize a GUI to specify the batch synchronization section. Exemplary GUI dialog boxes are described below. The user may also specify a type for the batch synchronization section. In one embodiment, the user may choose from the above-described batch synchronization section types: one-thread-only, serial, or parallel.

In step 404, user input indicating a desire to execute the test sequence to simultaneously test a group of units may be received. In response to this user input, a plurality (batch) of threads may be simultaneously executed in step 406, wherein each thread executes an instance of the test sequence.

As shown in step 408, each thread may execute its respective instance of the test sequence until arriving at the enter step of the batch synchronization section and may then block until all other threads in the plurality (batch) of threads arrive at the enter step.

As shown in step 410, once all threads in the plurality (batch) of threads have arrived at the enter step of the batch synchronization section, execution of the one or more functional steps in the batch synchronization section proceeds according to the type specified for the batch synchronization section, e.g., parallel, serial, or one-thread-only, similarly as described above with reference to the flowchart of FIG. 4. One or more threads may execute the functional steps in the batch synchronization section and in various orders.

For example, if the batch synchronization section is a one-thread-only batch synchronization section, then exactly one thread may execute the functional steps in the batch synchronization section. The other threads may skip execution of these steps and may resume execution from the exit step of the batch synchronization section. The determination of which thread executes these steps may be made in various ways. For example, in one embodiment, each thread may be assigned a priority order, and the thread with the highest priority may be chosen to execute these steps.

If the batch synchronization section is a serial batch synchronization section, then one thread at a time may execute the functional steps in the batch synchronization section until all the threads in the batch have executed these steps. The determination of the order in which the threads execute these steps may be made in various ways. For example, in one embodiment, each thread may be assigned a priority order, e.g., when the threads are created, and the threads may execute these steps in priority order.

If the batch synchronization section is a parallel batch synchronization section, then all the threads in the plurality (batch) of threads may execute the functional steps in the batch synchronization section in parallel (simultaneously).

As shown in step 412, each thread that executes the functional steps in the batch synchronization section may block at the exit step of the batch synchronization section until all other threads in the plurality (batch) of threads arrive at the exit step. Once all threads have arrived at the exit step, each thread resumes its respective execution of the test sequence from the exit step, as shown in step 414.

Thus, the above-described method may enable a group of units to be tested simultaneously. A separate thread may execute an instance of the test sequence to test each unit, wherein each thread has its own execution flow. For example, different threads may execute different steps of the sequence, e.g., depending on execution results obtained when performing the tests on their respective units. While each thread has an independent execution flow, it may be desirable for certain portions of the test sequence to be synchronized using batch synchronization sections. As one example, if a portion of the test sequence is operable to raise the temperature of a test chamber in which the group of units is being tested, then a one-thread-only batch synchronization section may be included in the test sequence to ensure that only one thread raises the temperature and to ensure that all threads are ready to execute the high-temperature portions of the testing process once the temperature has been raised.

Batch Specification and Synchronization Step Types

The next sections describe particular embodiments of Batch Specification and Batch Synchronization step types for use in a test sequence. The user may configure these steps using GUI dialog boxes. In the preferred embodiment, the user is not required to write code modules for these step types.

A batch may be used to define and synchronize a group of threads. This is useful when the user wants to test a group of units-under-test (UUTs) simultaneously. Each UUT may be tested in a separate thread, and the user may use a Batch Specification step to include the UUT threads in one batch. The user may use a Batch Synchronization step to control the interaction of the UUT threads as they execute the test steps. More specifically, the user may place Batch Synchronization steps around one or more test steps to create a "batch synchronization section".

The user can configure a batch synchronization section so that only one UUT enters the section at a time, no UUTs enter the section until all are ready, and/or no UUTs proceed beyond the section until all are done. This is useful for example when, for a particular test, the user has only one test resource which must be applied to each UUT in turn. The user can also configure a synchronized section to guarantee that only one thread executes the steps in the section. This is useful for an action that applies to the entire batch, such as raising the temperature in an environmental chamber. Having a separate thread for each UUT allows the user to exploit parallelism where possible, while enforcing serialization when necessary. It also allows the user to use preconditions and other branching options so that each UUT has its own flow of execution.

In one embodiment, the user does not have to create a batch. For example, within the TestStand test executive environment, the TestStand Batch process model does this for the user. The Batch process model uses Batch Specification steps to group execution threads together so that the user can use Batch Synchronization steps to synchronize them in the user sequence file. If the user wants to create a synchronized section around a single step, the user can do so using the Synchronization tab of the Step Properties dialog box rather than by using explicit Batch Synchronization steps.

Common Attributes

In one embodiment, the user may specify the following common attributes in various batch specification and synchronization dialog boxes:

Name—When the user creates a synchronization object, the user can specify a unique name with a string literal or an expression that evaluates to a string. If an object with the same name and type already exists, the user can create a reference to the existing object. Otherwise the user may create a reference to a new synchronization object. By creating a reference to an existing object, the user can access the same synchronization object from multiple threads or executions.

In one embodiment, if the user specifies an empty string as the name for a synchronization object, then an unnamed synchronization object may be created that the user can access through an ActiveX reference variable. To associate an unnamed synchronization object with an ActiveX reference variable, the user may select an object lifetime of "Using ActiveX Reference". To access a synchronization object across threads without creating a reference in each thread, the user may store a reference to the synchronization object in an ActiveX reference variable and access the object from multiple threads using the variable.

In one embodiment, by default, a synchronization object is accessible only from the process in which the user creates it. However, in one embodiment the user can make a synchronization object accessible from other processes, such as multiple instances of an operator interface, by using an asterisk (*) as the first character in the name. In addition, the user can create a synchronization object on a specific machine by beginning the name with the machine name, such as "\\machinename\syncobjectname". The user can then use this name to access the synchronization object from any machine on the network. For example, the user may set up the TestStand test executive engine as a server for remote execution, e.g., through DCOM.

Lifetime—The user may specify a lifetime for each reference to a synchronization object, such that the object exists for at least as long as the reference exists. The object can, however, exist longer if another reference to the object has a different lifetime.

In one embodiment, the reference lifetime choices are "Same as Thread", "Same as Sequence", or "Using ActiveX Reference". If the user refers to the synchronization object only by name, then the user may set its reference lifetime to "Same as Thread" or "Same as Sequence". This guarantees that the object lives as long as the thread or sequence in which the user creates the reference. If the user wants to control the lifetime of the object reference explicitly, or if the user wishes to refer to the object using an ActiveX reference variable, the user may choose the "Using ActiveX Reference" option. The user can use the ActiveX reference to the object in place of its name when performing operations on the object. The user can also use the reference from other threads without performing a Create operation in each thread. An ActiveX reference releases its object when the user sets the variable equal to Nothing, reuses the variable to store a different reference, or the variable goes out of scope. When the last ActiveX reference to a synchronization object releases, the object may be automatically disposed of.

Some synchronization objects have an operation, such as Lock or Acquire, for which the user can specify a lifetime that determines the duration of the operation.

Timeout—Synchronization objects may perform one or more operations that timeout if they do not complete within the time interval the user specifies. The user can specify to treat a timeout as an error condition or the user can explicitly check for the occurrence of a timeout by checking the value of the Step.Result.TimeoutOccurred property.

Batch Step Types

For the batch synchronization object, there are two step types, Batch Specification and Batch Synchronization. To use any synchronization step type, the user may insert a step of that type and may configure the step, e.g., using a dialog box or wizard. For example, the user may select a "Configure" item from a context menu for the step to display a configuration dialog box. In the configuration dialog box, the user may select an operation for the step to perform. The user can then specify settings for the selected operation. Some operations may store output values to variables the user specifies. If the control for an output value is labeled as an optional output, the user can leave the control empty.

Batch Specification Step Type

When the user writes a process model, the user can use Batch Specification steps to define a group of threads where each thread in the group runs an instance of the client sequence. The user can define a group (batch) so that batch synchronization operations can be performed on the threads in the group. For example, the TestStand Batch process model uses Batch Specification steps to create a batch that contains a thread for each TestSocket.

Create Operation

Figure 10:
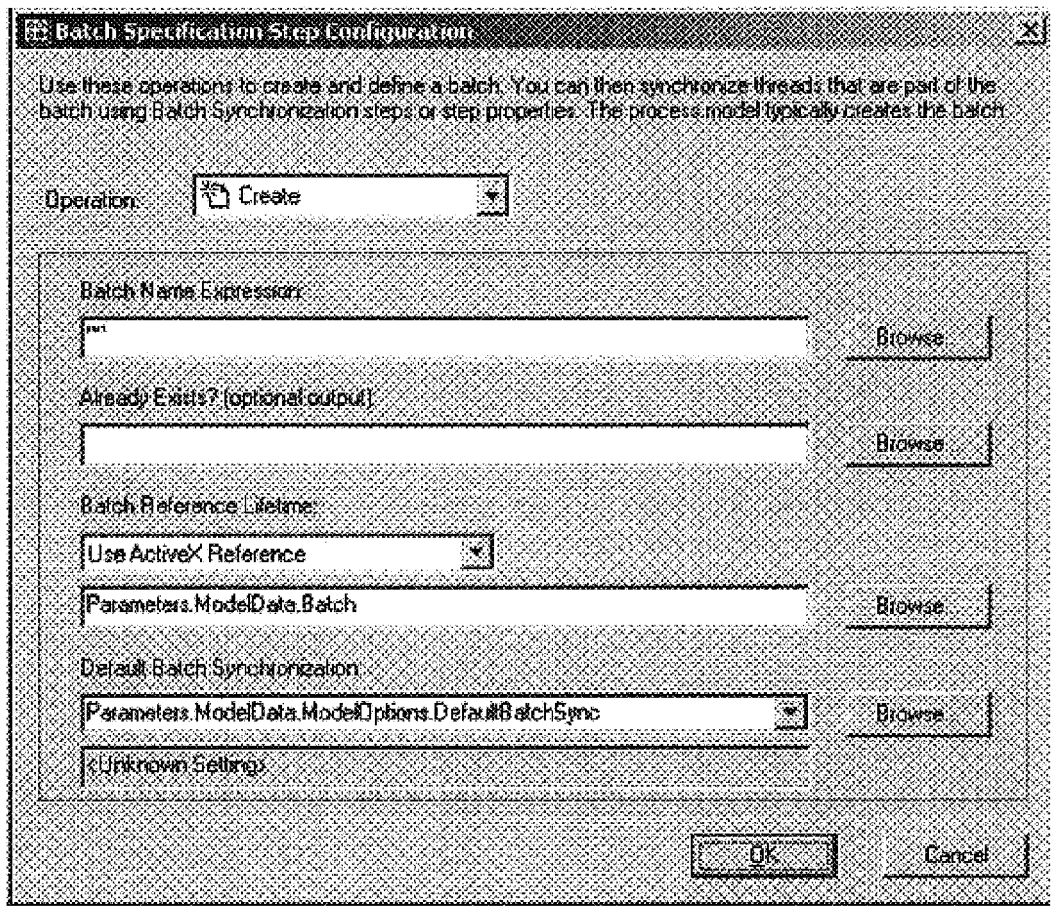
FIGS. 10–13 illustrate exemplary GUI dialog boxes for configuring Batch Specification steps for a test sequence or process model.

To create a reference to a new or existing batch object, the user may insert a Batch Specification step and configure the step, e.g., by selecting a "Configure Batch Specification" item from a context menu for the step. FIG. 10 illustrates an exemplary dialog box for configuring a Batch Specification step, in which a "Create" option has been selected for the operation. The following GUI controls enable the user to configure the Create operation:

Batch Name Expression—This control may be used to specify a unique name for the batch object using a string literal or an expression that evaluates to a string. Batch object names are described in more detail above.

Already Exists—This control may be used to specify a location to store a Boolean value that indicates whether the batch object already exists.

Batch Reference Lifetime—This control may be used to specify the lifetime of the reference to the batch object.

Default Batch Synchronization—This control may be used to specify the default method of batch synchronization to use with the batch object.

Add Thread Operation

Figure 11:
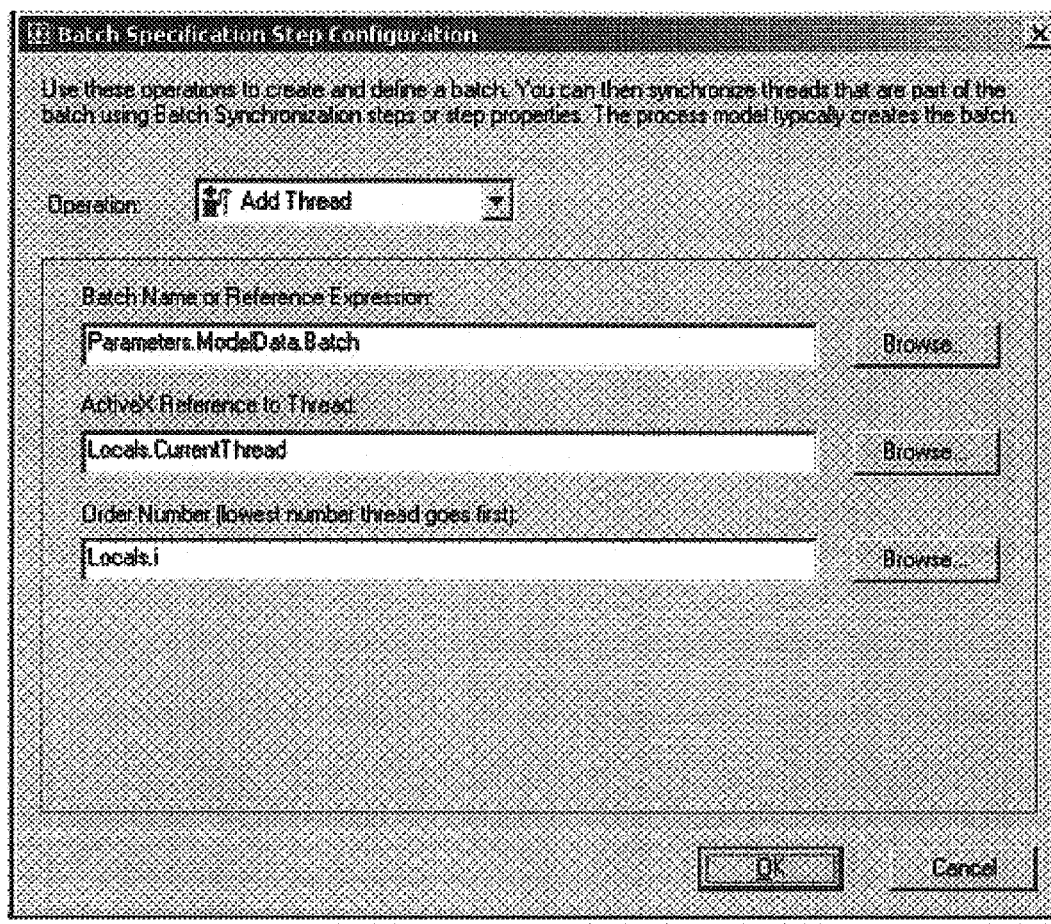

The Add Thread operation may be used to add a thread to a group of batch threads. FIG. 11 illustrates an exemplary dialog box for configuring a Batch Specification step, in which an "Add Thread" option has been selected for the operation. The following GUI controls enable the user to configure the Add Thread operation:

Batch Name or Reference Expression—This control may be used to specify the batch on which to perform the operation. The user can specify the batch by name or by an ActiveX reference received when the batch is created with the Using ActiveX Reference lifetime option.

ActiveX Reference to Thread—This control may be used to specify a thread to add to the batch. In one embodiment, a thread can belong to only one batch at a time. Adding a thread to a batch may remove the thread from its previous batch, if any. Additionally, when a thread terminates, it may remove itself from the batch.

Order Number—This control may be used to specify the order in which threads enter synchronized sections. Threads with a lower order number enter a synchronized section before threads with a higher order number.

Remove Thread Operation

Figure 12:
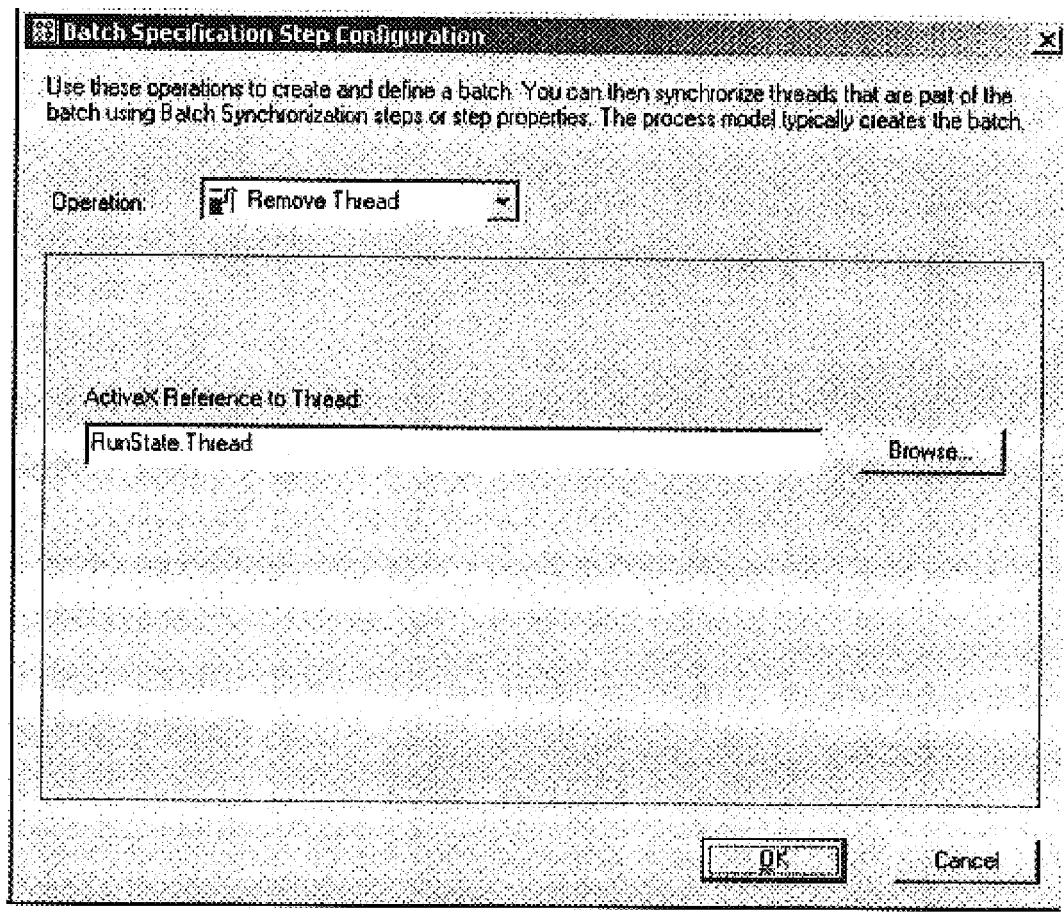

The Remove Thread operation may be used to remove a thread from a group of batch threads. FIG. 12 illustrates an exemplary dialog box for configuring a Batch Specification step, in which a "Remove Thread" option has been selected for the operation. The following GUI controls enable the user to configure the Remove Thread operation:

ActiveX Reference to Thread—This control may be used to specify the thread to remove from its batch.

Get Status Operation

Figure 13:
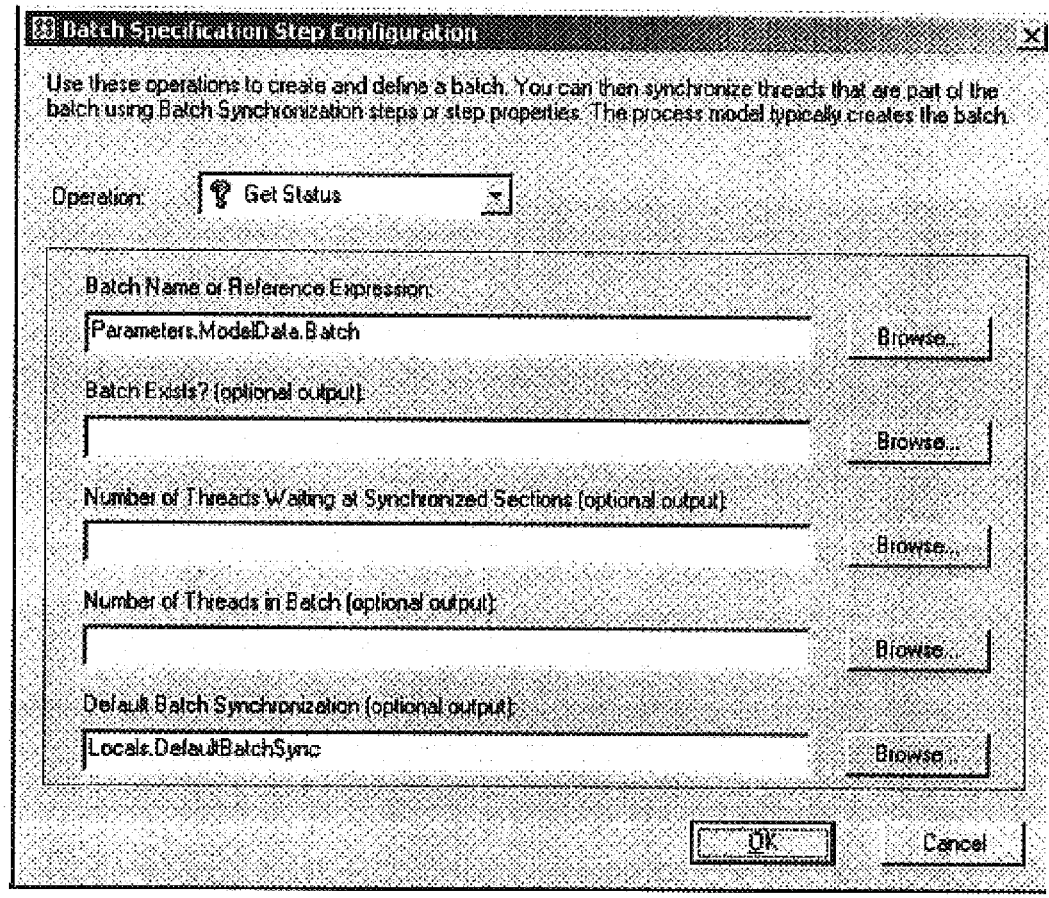

The Get Status operation may be used to obtain information about the current state of the batch. FIG. 13 illustrates an exemplary dialog box for configuring a Batch Specification step, in which a "Get Status" option has been selected for the operation. The following GUI controls enable the user to configure the Get Status operation:

Batch Name or Reference Expression—This control may be used to specify the batch on which to perform the operation. The user can specify the batch by name or by an ActiveX reference received when the batch is created with the Using ActiveX Reference lifetime option.

Batch Exists?—This control may be used to specify a location to store a Boolean value that indicates whether the batch already exists.

Number of Threads Waiting at Synchronized Sections—This control may be used to specify a location to store a numeric value that indicates the number of threads waiting to enter or exit synchronized sections.

Number of Threads in Batch—This control may be used to specify a location to store the numeric value indicating the number of threads that are currently part of the batch.

Default Batch Synchronization—This control may be used to specify a location to store a numeric value indicating the default method of batch synchronization that the batch uses.

Batch Specification Step Properties

Figure 14:
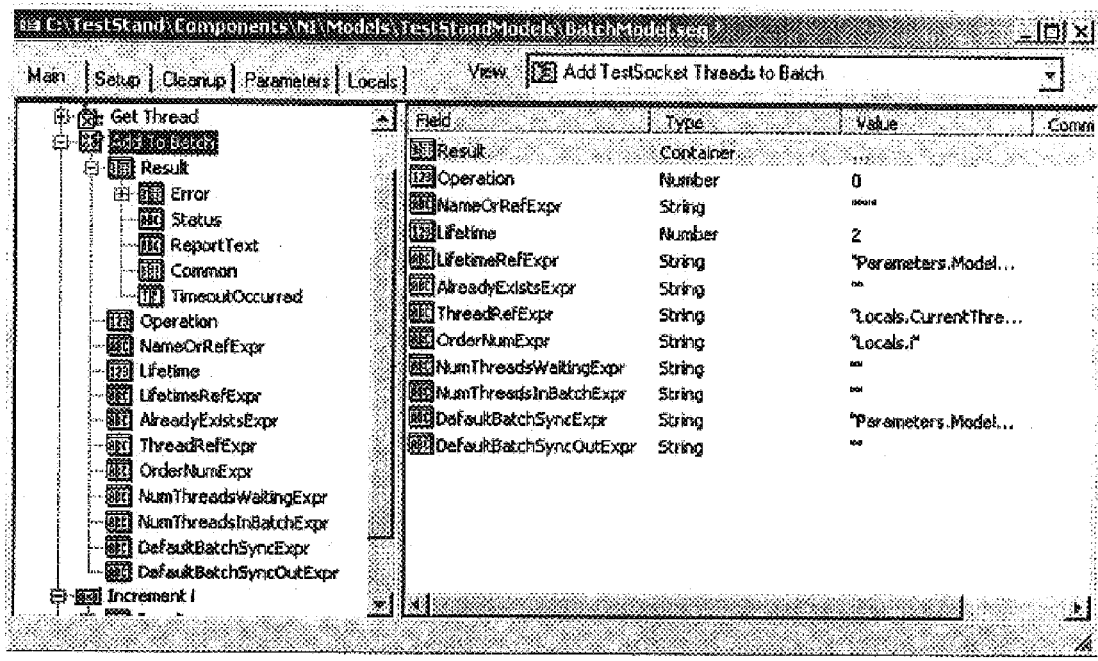
FIG. 14 illustrates various Batch Specification step properties.

The Batch Specification step type may define various Batch Specification step properties in addition to the common custom properties. For example, FIG. 14 illustrates the following Batch Specification step properties:

Step.Operation contains a value that specifies the operation the step performs. In one embodiment, the valid values are 0=Create, 1=Add Thread, 2=Remove Thread, 3=Get Status.

Step.NameOrRefExpr contains the Name expression for the Create operation and the Name or Reference expression for other batch operations.

Step.Lifetime contains a value that specifies the lifetime for the Create operation. In one embodiment, the valid values are 0="Same as Sequence", 1="Same as Thread", 2="Use ActiveX Reference".

Step.LifetimeRefExpr contains the ActiveX reference expression for the batch lifetime when the user sets the lifetime to "Use ActiveX Reference".

Step.AlreadyExistsExpr contains the "Already Exists" expression for the Create operation or the "Batch Exists" expression for the Get Status operation.

Step.ThreadRefExpr contains the "ActiveX Reference to Thread" expression for the Add Thread and Remove Thread operations.

Step.OrderNumExpr contains the "Order Number" expression for the Add Thread operation.

Step.NumThreadsWaitingExpr contains the "Number of Threads Waiting at Synchronized Sections" expression for the Get Status operation.

Step.NumThreadsInBatchExpr contains the "Number of Threads in Batch" expression for the Get Status operation.

Step.DefaultBatchSyncExpr contains the "Default Batch Synchronization" expression for the Create operation.

Step.DefaultBatchSyncOutExpr contains the "Default Batch Synchronization" expression for the Get Status operation.

Batch Process Model

Figure 15:
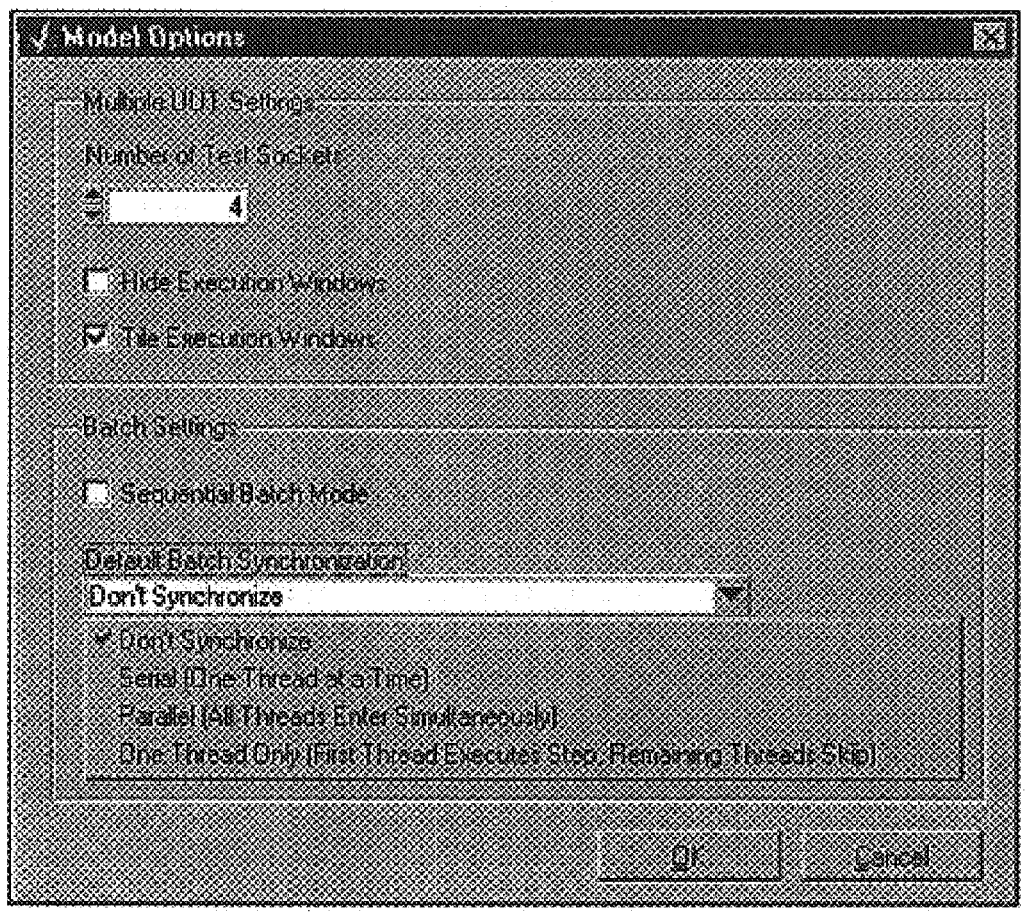
FIG. 15 illustrates a dialog box for configuring various options of a batch process model.

As noted above, in one embodiment the user does not need to explicitly create Batch Specification steps. A Batch process model may be provided which includes Batch Specification steps to create a batch for the user. The Batch process model makes it easy to simultaneously test groups of similar UUTs. The user uses the Batch model to run the same test sequence on multiple UUTs at the same time. The user may specify the number of test sockets (threads) to use in the Model Options dialog box, shown in FIG. 15. The Model Options dialog box includes the following controls.

Number of Test Sockets—Specifies the number of UUTs that the system can test simultaneously. The Batch process model launches a separate test sequence execution for each test socket. The sequence can inspect the value of RunState.Thread.TestSocketIndex to determine the zero-based index of the test socket on which it is running. This property contains a value of −1 if the sequence is not running on multiple test sockets.

Hide Execution Windows—Specifies that the operator interface application does not display windows for individual test socket executions.

Tile Execution Windows—Specifies that the operator interface application arranges test socket execution windows so they do not overlap.

Sequential Batch Mode—Specifies that the model runs test socket executions one at a time in ascending test socket order.

Default Batch Synchronization—Specifies the Batch Synchronization for sequence files that do not change their Batch Synchronization setting from the default value of Use Model Setting. Because the default batch synchronization setting for a step is Use Sequence File Setting and the default batch synchronization setting for a sequence file is Use Model Setting, setting the Default Batch Synchronization setting in the model effectively changes the batch synchronization setting for all steps that do not specify a non-default setting.

Bring UUT Dialog to Front When Status Changes—Specifies that the UUT dialog box activates whenever a UUT completes testing or when a test socket execution terminates.

The Batch process model may be used to control a set of test sockets (threads) that test multiple UUTs as a group. For example, the user might have a set of circuit boards attached to a common carrier. The Batch model ensures that the testing of all boards starts and stops at the same time. The Batch model also supports batch synchronization features. For example, the user can specify that, because a particular step applies to the batch as a whole, the step runs only once per batch instead of once for each UUT (one-thread-only batch synchronization section). The batch model also enables the user to specify that certain steps or groups of steps cannot run on more than one UUT at a time (serial batch synchronization section) or that certain steps must run on all UUTs at the same time (parallel batch synchronization section).

Figure 16:
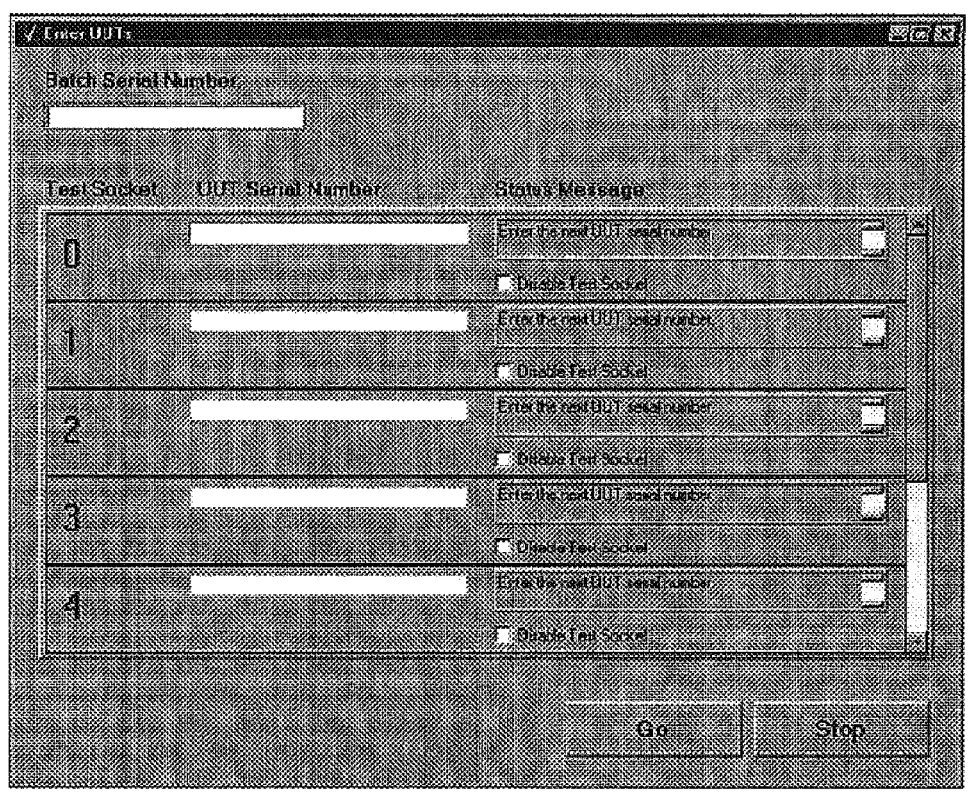
FIGS. 16 and 17 illustrate dialog boxes for conducting tests and viewing test results of a group of units under test, using the batch process model.

The batch model can generate batch reports that summarize the test results for the UUTs in the batch. When the user select the Single Pass entry point, the Batch model launches a single pass execution for each test socket without prompting for UUT serial numbers. When the user select the Test UUTs entry point, the Batch model displays the Batch UUT Identification dialog box, shown in FIG. 16. The Batch UUT Identification dialog box enables the user to specify the UUTs and test sockets on which to initiate a batch test. The Batch UUT Identification dialog box includes the following controls:

Batch Serial Number—Identifies the serial number of the batch of UUTs to test. Leave the control empty if there is no applicable serial number.

Test Socket—Displays the test socket index.

UUT Serial Number—Identifies the serial number of the UUT to test in the test socket.

Status Message—Displays the state of the test socket or displays a prompt.

Disable Test Socket—Disables the test socket.

Go—Starts testing for the current batch of UUTs. The batch model runs an instance of the client sequence file in a separate execution for each test socket.

Stop—Exits the dialog box without starting another batch test.

Figure 17:
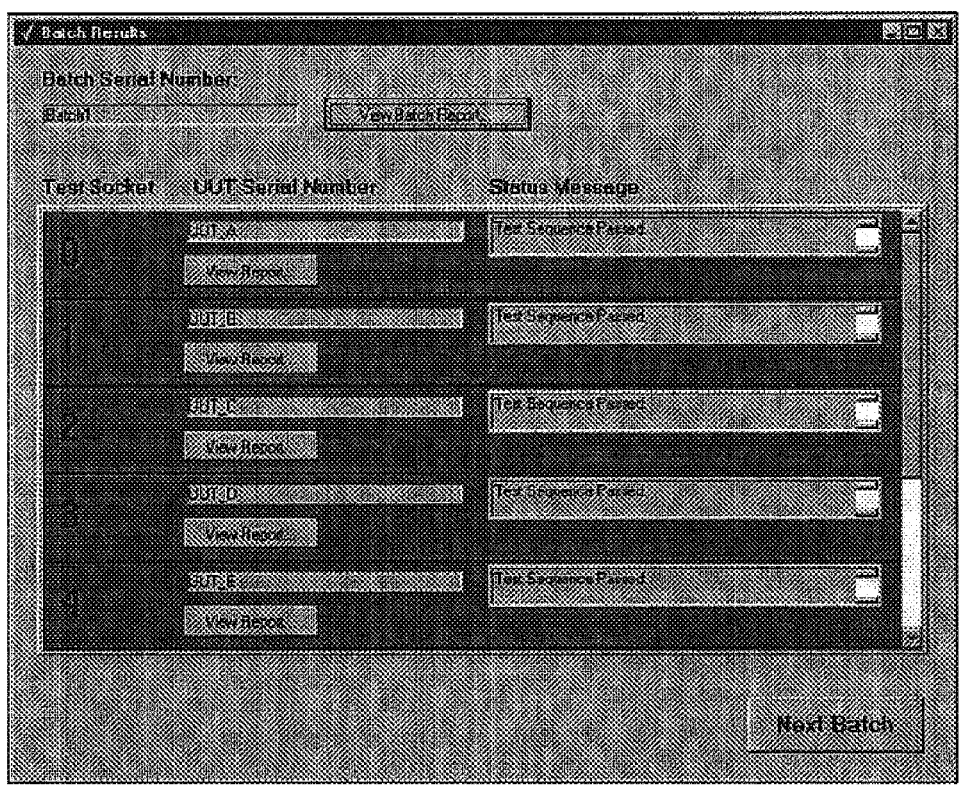

When a UUT batch completes, the Batch model displays the Batch Results dialog box, shown in FIG. 17. The Batch Results dialog box enables the user to view the status and reports for each test socket and UUT when a batch test completes. The Batch Results dialog box includes the following controls:

Batch Serial Number—Displays a serial number that identifies the batch of UUTs.

View Batch Report—Displays the report for the batch. The user can select whether to view the report for the current batch only or to view the entire file that the user configure batch reports to append to.

Test Socket—Displays the test socket index.

UUT Serial Number—Displays a serial number that identifies the UUT in the test socket.

View Report—Display the report for the UUT in the test socket. The user can select whether to view the report for the current UUT only or to view the entire file that the user configure UUT reports for the test socket to append to.

Status Message—Displays the final status of the UUT.

Next Batch—Returns to the Batch UUT Identification dialog box.

Figure 18:
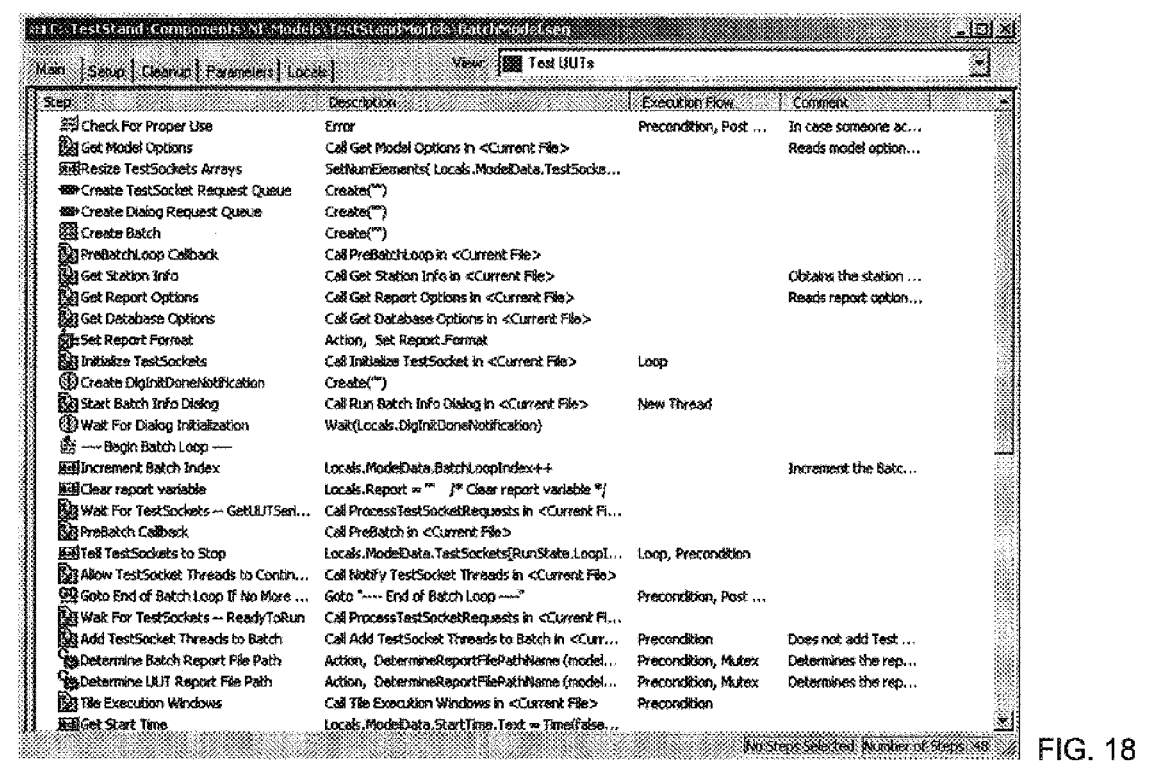
Figure 19:
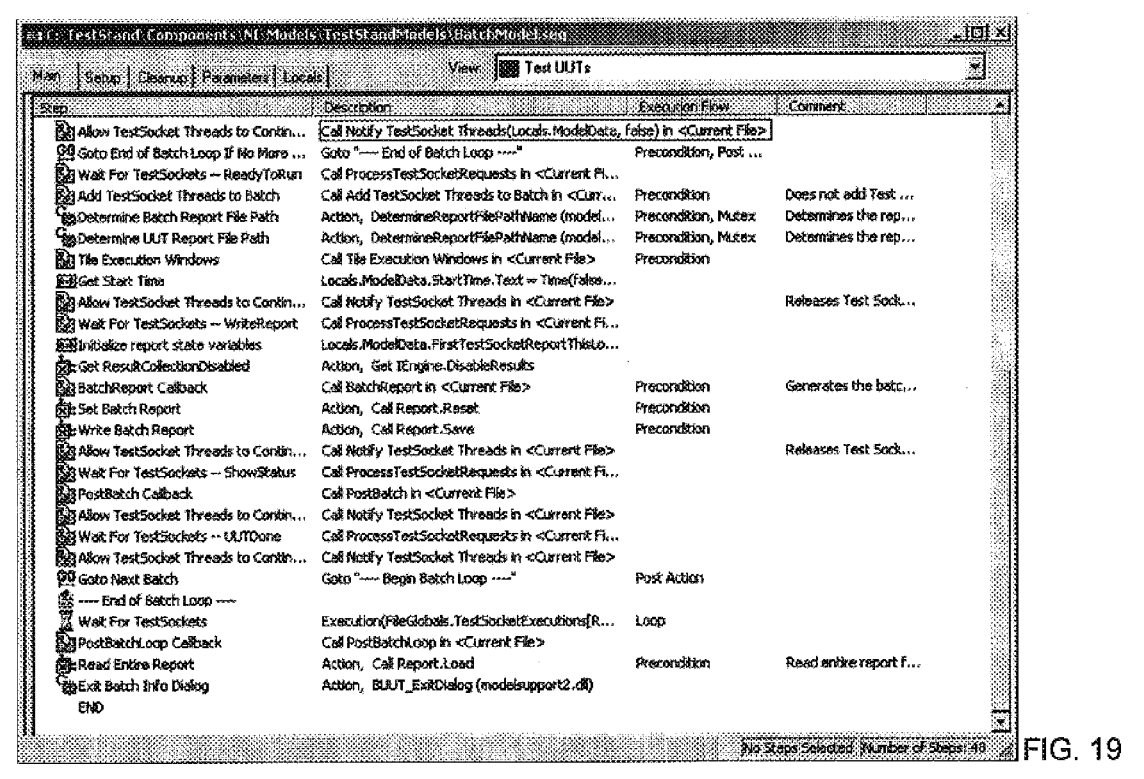

FIGS. 18 and 19 show the entire set of steps for the Test UUTs entry point in the TestStand batch process model.

Batch Synchronization Step Type

Batch Synchronization steps may be used to define sections of a sequence in which to synchronize multiple threads that belong to one batch. For example, the user may use these steps in a sequence executed using a Batch process model.

Synchronized Sections

Batch Synchronization steps may be used to define batch synchronization sections by placing a step at the beginning and end of a section of steps in a sequence and specifying an Enter operation for the beginning step and an Exit operation for the ending step. The Enter and Exit steps may be placed in the same sequence, but do not have to be placed in the same step group. There may be various types of batch synchronization sections. For example, in one embodiment, there are three types of batch synchronization sections: serial, parallel, and one-thread-only. In one embodiment, all batch synchronization sections have the following properties in common:

Each thread in a batch that enters a batch synchronization section blocks at the Enter step until all other threads in the batch arrive at their respective instances of the Enter step.

Each thread in a batch that reaches the end of the batch synchronization section blocks at the Exit step until all other threads in the batch arrive at their respective instances of the Exit step.

Serial Sections

A serial section may be used to ensure that each thread in the batch executes the steps in the section sequentially and in the order specified when the batch is created. When all threads in a batch arrive at their respective instances of an Enter step for a serial section, the threads may be released one at a time in ascending order according to Order Numbers assigned to the threads when the threads are added to the batch using the Batch Specification step. As each thread reaches the Exit step for the section, the next thread in the batch may proceed from the Enter step. After all the threads in the batch arrive at the Exit step, they exit the section together.

Parallel Sections

When all threads in a batch arrive at their respective instances of an Enter step for a parallel section, the threads may be released all at once. Each thread that arrives at the Exit step for the section may block until all threads in the batch reach that step.

One-Thread-Only Sections

A one-thread-only section may be used to specify that only one thread in the batch executes the steps in the section. Typically, this section type is used to perform an operation that applies to the batch as a whole, such as raising the temperature in a test chamber. When all threads in a batch arrive at their respective instances of an Enter step for a one-thread-only section, only the thread with the lowest Order Number may be released. When that thread arrives at the Exit step for the section, all remaining threads in the batch step may jump from the Enter step to the Exit step, skipping the steps within the section. The threads in the batch may then exit the section together.

Mismatched Sections

Sections become "mismatched" when all threads in a batch are blocked at an Enter or an Exit operation, but they are not all blocked at the same Enter or Exit operation. This can occur when a sequence has a conditional flow of execution due to preconditions, post actions, or other flow control operations. In one embodiment, when mismatched sections are detected, the situation may be handled as follows:

The thread that is at the Enter or Exit step that appears earliest in the hierarchy of sequences and subsequences proceeds as if all threads in the batch are at the same step.

If multiple Enter and Exit operations are equally early in the hierarchy of sequences and subsequences, Enter operations proceed first.

Nested Sections

Nesting of sections can occur either within the same sequence or as a result of calling a subsequence inside of a synchronized section when the subsequence also contains a synchronized section. When one section is nested inside another, the inner section may be honored if the type of the outer section is Serial or Parallel. For example, if one serial section is nested in another serial section, each thread that enters the outer section may proceed only until the Enter step of the inner section and may then wait for the other threads to reach the same step. The inner section may be ignored if the type of the outer section is "One-Thread-Only".

Enter Synchronized Section Operation

Figure 20:
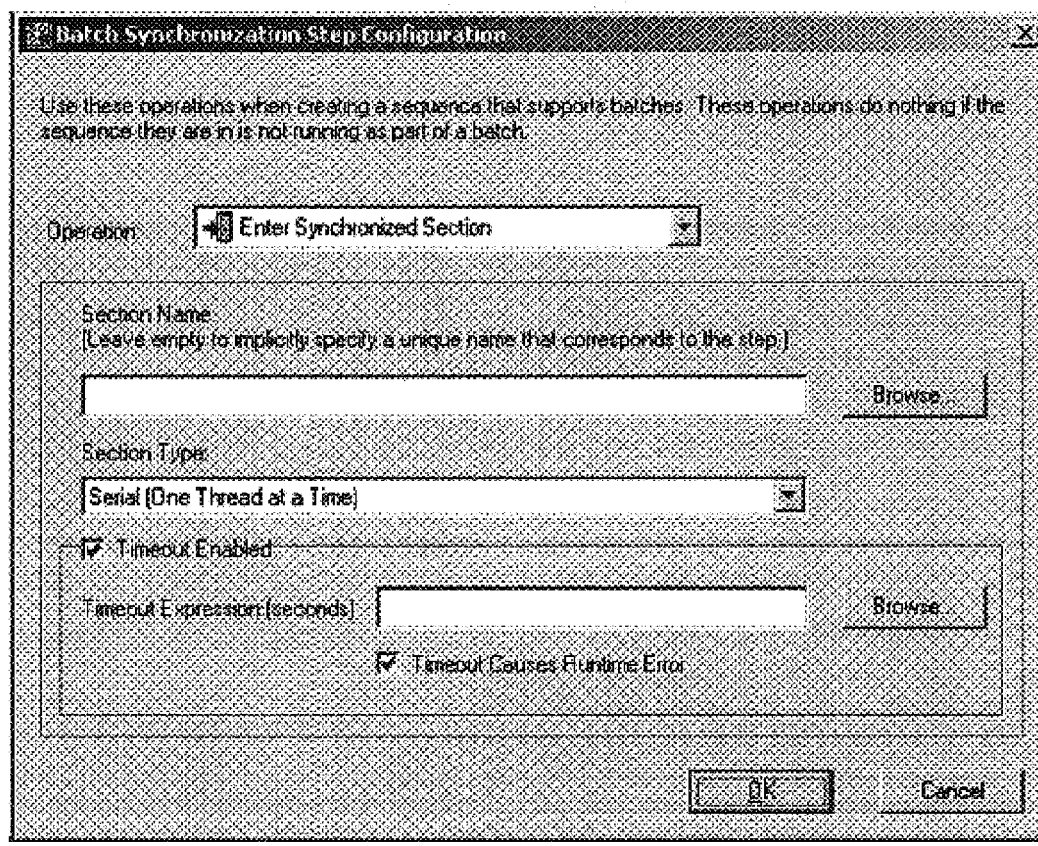
FIGS. 20–22 illustrate exemplary GUI dialog boxes for configuring Batch Synchronization steps for a test sequence.

The Enter Synchronized Section operation may be used to mark the beginning of a batch synchronization section and to define the type of synchronization for that section. FIG. 20 illustrates an exemplary dialog box for configuring a Batch Synchronization step, in which an "Enter Synchronized Section" option has been selected for the operation. The following GUI controls enable the user to configure the Enter Synchronized Section operation:

Section Name—This control may be used to specify a name for the batch synchronization section, or the control may be left blank if the user wants a unique name to be automatically generated based on the step name.

Section Type—This control may be used to specify the type of batch synchronization section.

Timeout Enabled, Timeout Expression, Timeout Causes Run-Time Error—These controls may be used to specify a timeout and timeout behavior for when a thread must wait at the Enter step. If a timeout occurs, the property Step.Result.TimeoutOccurred is set to True.

Exit Synchronized Section Operation

Figure 21:
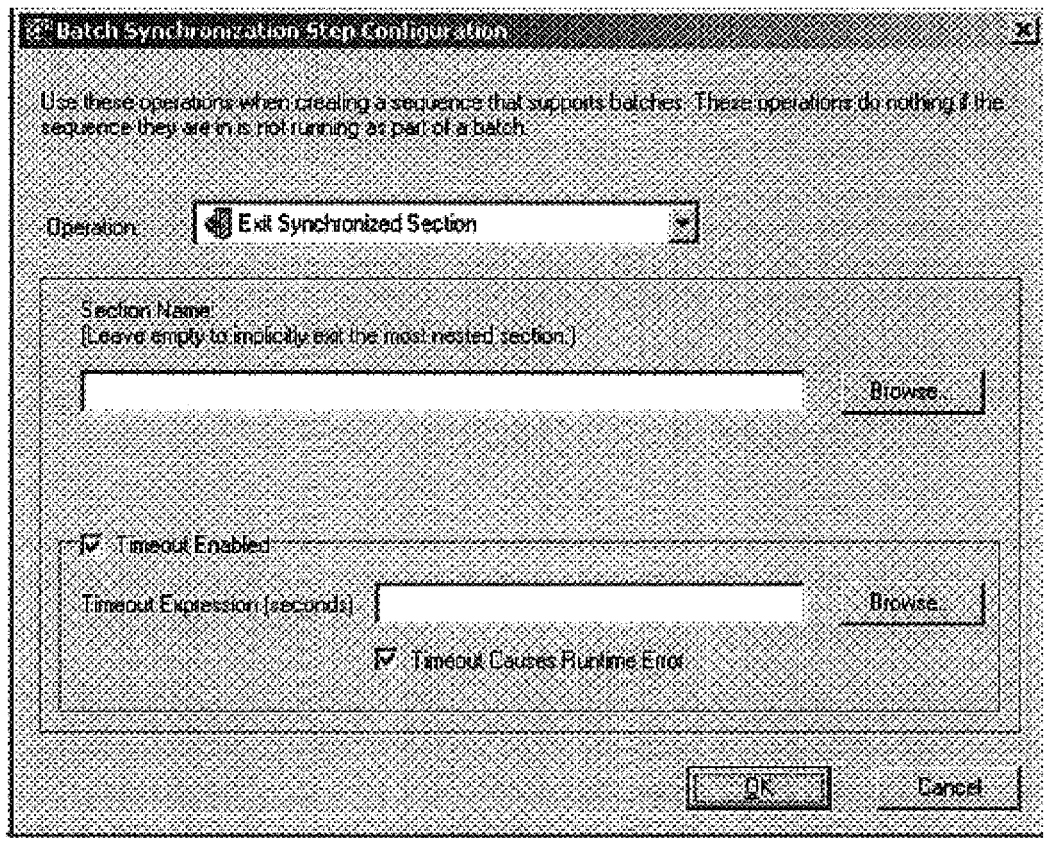

The Exit Synchronized Section operation may be used to mark the end of a batch synchronization section. FIG. 21 illustrates an exemplary dialog box for configuring a Batch Synchronization step, in which an "Exit Synchronized Section" option has been selected for the operation. The following GUI controls enable the user to configure the Exit Synchronized Section operation:

Section Name—This control may be used to specify the name of the batch synchronization section to exit, or the control may be left blank to refer the most nested section.

Timeout Enabled, Timeout Expression, Timeout Causes Run-Time Error—These controls may be used to specify a timeout and timeout behavior for when a thread must wait at the Exit step. If a timeout occurs, the property Step.Result.TimeoutOccurred is set to True.

Exit All Sections in Current Sequence Operation

Figure 22:
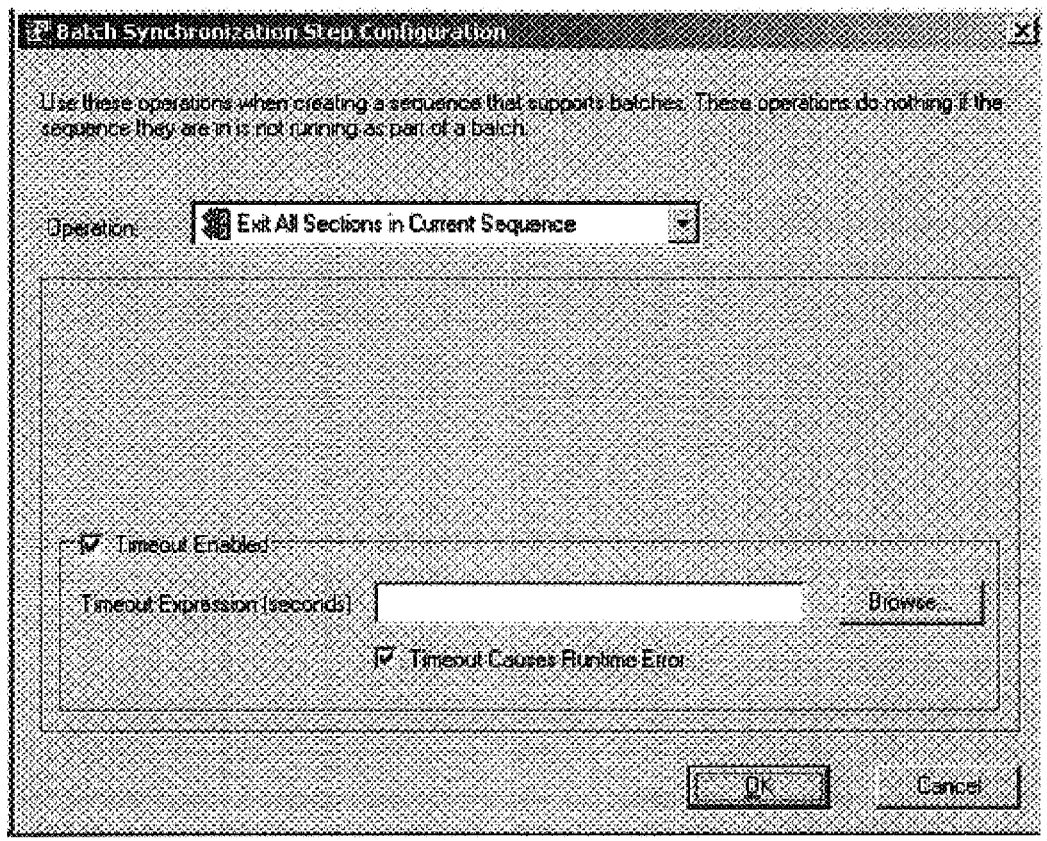

The Exit All Sections in Current Sequence operation may be used to exit all the sections that a thread has entered in the current sequence. This is useful when the flow of execution for a thread jumps out of a batch synchronization section into a Cleanup step group because of a run-time error. Putting an Exit All Sections in Current Sequence step in the Cleanup step group ensures that the thread does not cause other threads to block at the end of that batch synchronization section or any nested batch synchronization sections. FIG. 22 illustrates an exemplary dialog box for configuring a Batch Synchronization step, in which an "Exit All Sections in Current Sequence" option has been selected for the operation. The following GUI controls enable the user to configure the Exit All Sections in Current Sequence operation:

Timeout Enabled, Timeout Expression, Timeout Causes Run-Time Error—These controls may be used to specify a timeout and timeout behavior for when a thread must wait at the Exit step. If a timeout occurs, the property Step.Result.TimeoutOccurred is set to True.

Batch Synchronization Step Properties

Figure 23:
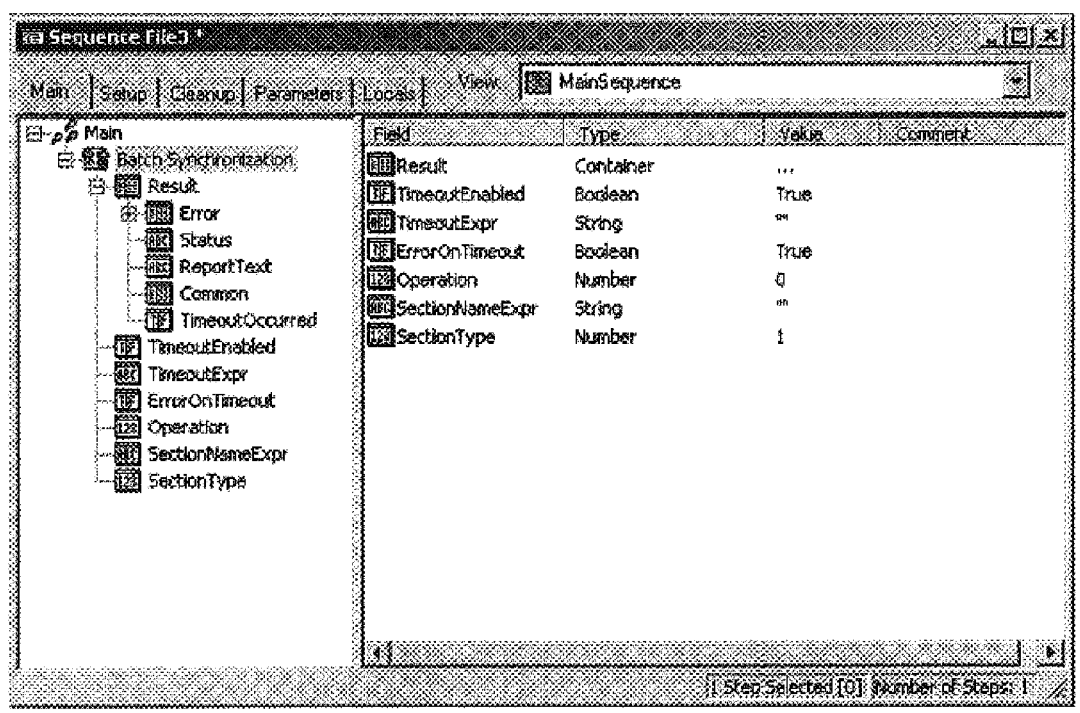
FIG. 23 illustrates various Batch Synchronization step properties.

The Batch Synchronization step type may define various Batch Synchronization step properties in addition to the common custom properties. For example, FIG. 23 illustrates the following Batch Synchronization step properties:

Step.Result.TimeoutOccurred is set to True if an Enter or Exit operation times out.

Step.TimeoutEnabled contains the timeout enabled setting for the Enter or Exit operation.

Step.TimeoutExpr contains the timeout expression, in seconds, for the Enter or Exit operation.

Step.ErrorOnTimeout contains the Timeout Causes Run-Time Error setting for the Enter or Exit operation.

Step.Operation contains a value that specifies the operation the step performs. In one embodiment, the valid values are 0=Enter Synchronized Section, 1=Exit Synchronized Section, 2=Exit All Sections in Current Sequence.

Step.SectionNameExpr contains the expression that specifies the name of the section for the Enter or Exit operation.

Step.SectionType contains a value that specifies the type of section the Enter operation defines. In one embodiment, the valid values are 1=Serial, 2=Parallel, 3=One Thread Only.

Thread Priority Step Type

The Thread Priority step may be used to boost or lower the priority of a thread. The previous priority value of the thread may be saved and restored once the thread no longer requires the altered priority value.

Set Thread Priority Operation

Figure 24:
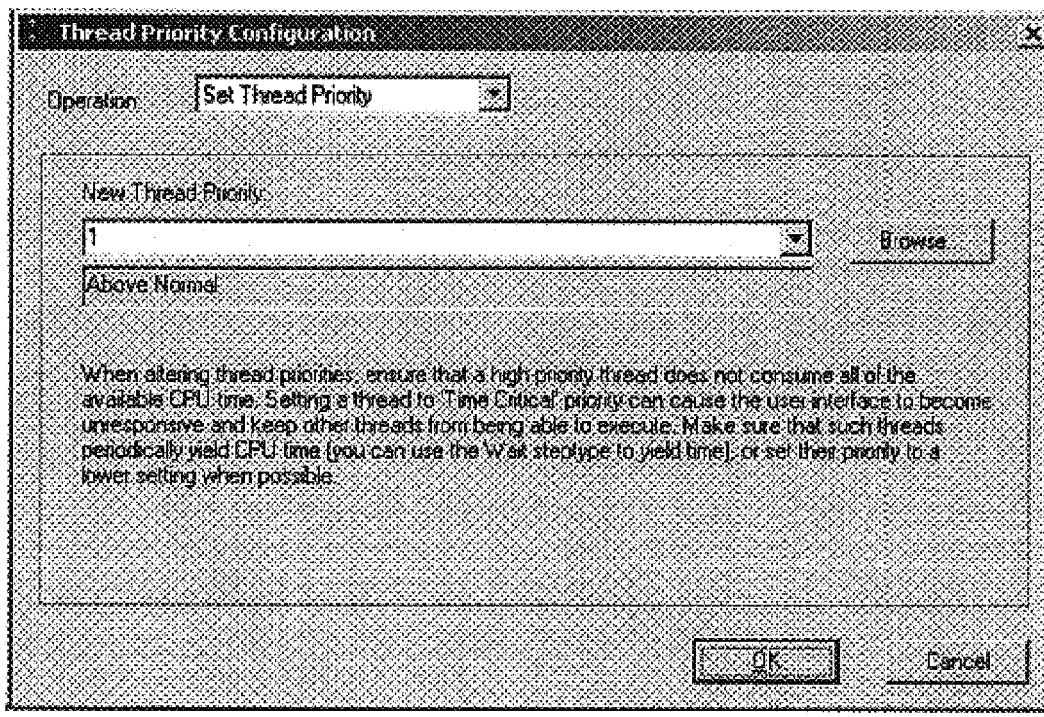
FIGS. 24–25 illustrate exemplary GUI dialog boxes for configuring Thread Priority steps for a test sequence.

The Set Thread Priority operation may be used to raise or lower the priority of the current thread. FIG. 24 illustrates an exemplary dialog box for configuring a Thread Priority step, in which a "Set Thread Priority" option has been selected for the operation. The following GUI controls enable the user to configure the Set Thread Priority operation:

New Thread Priority—This control may be used to specify a numeric value expression that indicates the new priority for the thread. If the user specifies the priority as a numeric constant, the name that corresponds to that priority is shown in the indicator control below this control. The drop-down list for this control may be used to choose a priority constant for a predefined priority setting. In one embodiment, the predefined priority settings are: −15=Idle, −2=Low, −1=Below Normal, 0=Normal, 1=Above Normal, 2=High, and 15=Time Critical.

Get Thread Priority Operation

Figure 25:
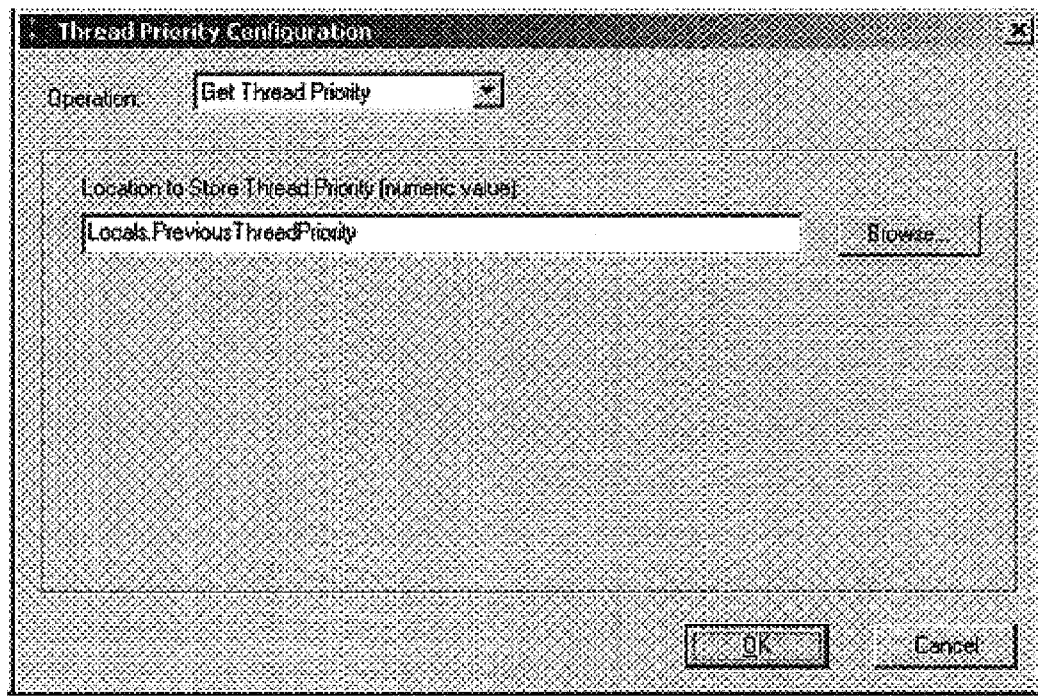

The Get Thread Priority operation, may be used to get the current priority setting for the current thread. FIG. 25 illustrates an exemplary dialog box for configuring a Thread Priority step, in which a "Get Thread Priority" option has been selected for the operation. The following GUI controls enable the user to configure the Get Thread Priority operation:

Location to Store Thread Priority—This control may be used to specify a location to store a numeric value specifying the priority setting for the current thread. When the user sets the thread priority for a sequence, the user may save the previous priority in the Setup step group and restore the priority in the Cleanup step group.

Thread Priority Step Properties

Figure 26:
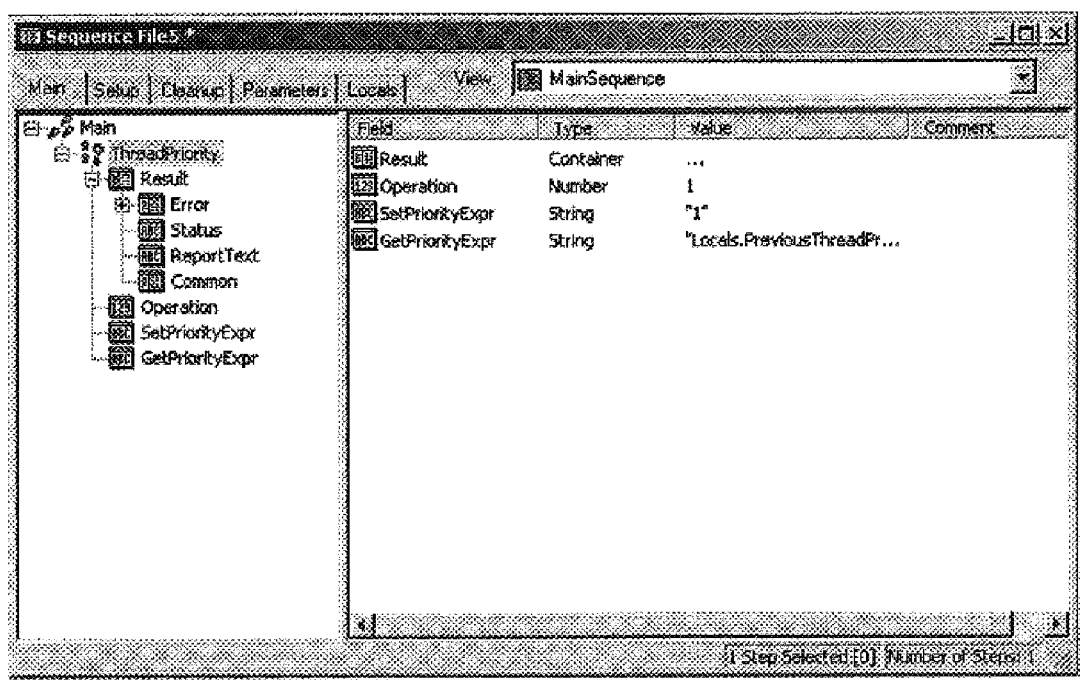
FIG. 26 illustrates various Thread Priority step properties.

The Thread Priority step type may define various Thread Priority step properties in addition to the common custom properties. For example, FIG. 26 illustrates the following Thread Priority step properties:

Step.Operation contains a value that specifies the operation the step is set to perform. In one embodiment, the valid values are 0=Set Thread Priority, 1=Get Thread Priority.

Step.SetPriorityExpr specifies the thread priority expression for the Set Thread Priority operation.

Step.GetPriorityExpr specifies the location to store the thread priority for the Get Thread Priority operation.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for executing multiple instances of a test sequence, the method comprising:

creating a test sequence in response to user input, wherein the test sequence includes a batch synchronization section;

simultaneously executing a plurality of threads, wherein each thread executes an instance of the test sequence;

the batch synchronization section synchronizing the execution of the plurality of threads.

2. The method of claim 1, wherein the test sequence comprises a plurality of steps;

wherein a subset of the steps are included in the batch synchronization section;

wherein said batch synchronization section synchronizing the execution of the plurality of threads comprises synchronizing the execution of the subset of steps by the plurality of threads.

3. The method of claim 1, wherein each thread executes an instance of the test sequence to test a unit;

wherein said simultaneously executing the plurality of threads comprises simultaneously testing a group of units.

4. The method of claim 3, wherein said simultaneously executing the plurality of threads comprises beginning testing of the units together and ending testing of the units together.

5. The method of claim 1, further comprising:

receiving user input indicating a desire to execute the test sequence to test a group of units;

wherein said simultaneously executing the plurality of threads is performed in response to the user input.

6. The method of claim 1, wherein the batch synchronization section includes an enter step;

wherein said simultaneously executing the plurality of threads comprises each thread executing its respective instance of the test sequence until arriving at the enter step;

wherein the batch synchronization section comprises functionality causing each thread to block at the enter step until all other threads in the plurality of threads arrive at the enter step.

7. The method of claim 6, wherein the batch synchronization section includes an exit step and one or more additional steps;

wherein the batch synchronization section comprises functionality for:

causing each thread to execute the one or more additional steps;

causing each thread to block at the exit step until all other threads in the plurality of threads arrive at the exit step.

8. The method of claim 7, wherein said causing each thread to execute the one or more additional steps comprises causing each thread to execute the one or more additional steps in parallel.

9. The method of claim 7, wherein said causing each thread to execute the one or more additional steps comprises causing one thread at a time to execute the one or more additional steps.

10. The method of claim 9, wherein a priority order is assigned to each thread;

wherein said causing one thread at a time to execute the one or more additional steps comprises causing the threads to execute the one or more additional steps in priority order.

11. The method of claim 6, wherein the batch synchronization section includes one or more additional steps;

wherein the batch synchronization section comprises functionality for:

causing exactly one thread to execute the one or more additional steps;

causing each of the other threads to skip the one or more additional steps.

12. The method of claim 1, further comprising:

receiving user input specifying a desired number of instances of the test sequence to be simultaneously executed;

wherein said simultaneously executing a plurality of threads comprises simultaneously executing the specified number of threads.

13. The method of claim 1, further comprising:

displaying a graphical user interface useable for specifying a batch synchronization section;

receiving user input specifying the batch synchronization section via the graphical user interface;

wherein said creating the test sequence comprises including the specified batch synchronization section in the test sequence.

14. The method of claim 1, wherein the batch synchronization section includes an enter step and an exit step, the method further comprising:

receiving user input specifying the enter step and the exit step via a graphical user interface;

wherein said creating the test sequence comprises including the enter step and the exit step in the test sequence.

15. A computer-implemented method for simultaneously testing a group of two or more units, the method comprising:

receiving user input indicating a desire to test the group of units;

simultaneously executing a plurality of threads to test the group of units in response to the user input;
wherein each thread executes an instance of a test sequence to test a corresponding unit from the group.

16. The method of claim 15,
wherein the threads execute such that each instance of the test sequence begins execution at the same time.

17. The method of claim 16,
wherein the threads execute such that each instance of the test sequence ends execution at the same time.

18. The method of claim 15,
wherein the test sequence includes a synchronized section for synchronizing execution of the plurality of threads.

19. The method of claim 18,
wherein the synchronized section includes an enter step and an exit step;
wherein said each thread executing an instance of the test sequence comprises each thread that arrives at the enter step blocking at the enter step until all other threads arrive at the enter step.

20. The method of claim 19,
wherein said each thread executing an instance of the test sequence further comprises each thread that arrives at the exit step blocking at the exit step until all other threads arrive at the exit step.

21. The method of claim 15,
wherein the test sequence includes a one-thread-only synchronized section comprising one or more steps, wherein the one-thread-only synchronized section specifies that the one or more steps are to be executed by only a single thread;
wherein said each thread executing an instance of the test sequence comprises only one thread executing the one or more steps of the one-thread-only synchronized section.

22. The method of claim 15,
wherein the test sequence includes a one-thread-only synchronized section;
wherein the one-thread-only synchronized section includes:
an enter step;
an exit step;
one or more additional steps;
wherein said each thread executing an instance of the test sequence comprises:
each thread executing steps of the test sequence until the thread reaches the enter step;
a single thread executing the one or more additional steps;
threads other than the single thread skipping from the enter step to the exit step.

23. The method of claim 15,
wherein the test sequence includes a serial synchronized section comprising one or more steps, wherein the serial synchronized section specifies that the one or more steps are to be executed by each thread sequentially;
wherein said each thread executing an instance of the test sequence comprises each thread executing the one or more steps of the serial synchronized section sequentially.

24. The method of claim 15,
wherein the test sequence includes a serial synchronized section;

wherein the serial synchronized section includes:
an enter step;
an exit step;
one or more additional steps;
wherein said each thread executing an instance of the test sequence comprises:
each thread executing steps of the test sequence until the thread reaches the enter step;
each thread executing the one or more additional steps until the thread reaches the exit step, wherein only one thread at a time executes the one or more additional steps.

25. The method of claim 15,
wherein the test sequence includes a parallel synchronized section comprising one or more steps, wherein the parallel synchronized section specifies that the one or more steps are to be executed by each thread in parallel;
wherein said each thread executing an instance of the test sequence comprises each thread executing the one or more steps of the parallel synchronized section in parallel.

26. The method of claim 15,
wherein the test sequence includes a parallel synchronized section;
wherein the parallel synchronized section includes:
an enter step;
an exit step;
one or more additional steps;
wherein said each thread executing an instance of the test sequence comprises:
each thread executing steps of the test sequence until the thread reaches the enter step;
each thread executing the one or more additional steps in parallel;
each thread that reaches the exit step blocking until all other threads reach the exit step.

27. The method of claim 15, further comprising:
receiving user input indicating a number of units in the group;
wherein the number of threads in the plurality of threads is equal to the number of units in the group.

28. The method of claim 15, further comprising:
associating a priority order with each thread in the plurality of threads.

29. A method for executing multiple instances of a test sequence, the method comprising:
including a plurality of steps in a test sequence;
defining an enter point and an exit point in the test sequence, wherein the enter point and the exit point surround a subset of the plurality of steps;
simultaneously executing a plurality of threads, wherein each thread executes an instance of the test sequence;
wherein said executing the plurality of threads comprises:
each thread blocking at the enter point until all other threads have arrived at the enter point;
one or more threads executing the subset of the plurality of steps;
each thread blocking at the exit point until all other threads have arrived at the exit point.

30. The method of claim 29,
wherein said defining the enter point and the exit point in the test sequence comprises including an enter step and an exit step in the test sequence, wherein the enter step and the exit step surround the subset of the plurality of steps.

31. A memory medium for executing multiple instances of a test sequence, the memory medium comprising program instructions executable to:
  include a plurality of steps in a test sequence;
  define an enter point and an exit point in the test sequence, wherein the enter point and the exit point surround a subset of the plurality of steps;
  simultaneously execute a plurality of threads, wherein each thread executes an instance of the test sequence;
  wherein said executing the plurality of threads comprises:
    each thread executing steps of the test sequence until arriving at the enter point and then blocking at the enter point until all other threads have arrived at the enter point;
    one or more threads executing the subset of the plurality of steps;
    each thread that arrives at the exit point blocking at the exit point until all other threads have arrived at the exit point.

32. A system for testing multiple units, the system comprising:
  a computer system including:
    a processor;
    a memory storing program instructions;
  a plurality of units under test coupled to the computer system;
  wherein the processor is operable to execute the program instructions to:
    receive user input indicating a desire to test the group of units;
    simultaneously execute a plurality of threads to test the plurality of units in response to the user input;
    wherein each thread executes an instance of a test sequence to test a corresponding unit from the plurality of units.

33. A method for executing multiple instances of a test sequence, the method comprising:
  creating a test sequence in response to user input, wherein a portion of the test sequence is specified for synchronous execution;
  simultaneously executing a plurality of threads, wherein each thread executes an instance of the test sequence;
  wherein said executing the plurality of threads comprises:
    synchronizing execution of respective instances of the portion of the test sequence specified for synchronous execution.

34. The method of claim 33, wherein the test sequence comprises one or more steps that specify said synchronous execution.

35. The method of claim 34, wherein the one or more steps are associated with program code that implements said synchronous execution.

* * * * *